US012749231B2

(12) United States Patent
Shi et al.

(10) Patent No.: US 12,749,231 B2
(45) **Date of Patent: *Sep. 29, 2026**

(54) METHODS FOR LABEL-FREE CELL SORTING AND SYSTEMS FOR SAME

(71) Applicant: Becton, Dickinson and Company, Franklin Lakes, NJ (US)

(72) Inventors: Shirley Shi, Fremont, CA (US); Woodrow Lomas, San Jose, CA (US); Wenyu Bai, San Jose, CA (US); Aaron Jacob Middlebrook, San Jose, CA (US); Stephanie J. Widmann, Carlsbad, CA (US); Aaron Jacob Tyznik, Cookeville, TN (US)

(73) Assignee: BECTON, DICKINSON AND COMPANY, Franklin Lakes, NJ (US)

(*) Notice: Subject to any disclaimer, the term of this patent is extended or adjusted under 35 U.S.C. 154(b) by 151 days.

This patent is subject to a terminal disclaimer.

(21) Appl. No.: 18/624,931

(22) Filed: Apr. 2, 2024

(65) Prior Publication Data

US 2025/0308080 A1 Oct. 2, 2025

(51) Int. Cl.
*G06T 11/00* (2026.01)
*G06V 10/762* (2022.01)
*G06V 10/764* (2022.01)

(52) U.S. Cl.
CPC ............ *G06T 11/00* (2013.01); *G06V 10/762* (2022.01); *G06V 10/764* (2022.01)

(58) Field of Classification Search
CPC ..... G06T 11/00; G06V 10/762; G06V 10/764
See application file for complete search history.

(56) References Cited

U.S. PATENT DOCUMENTS 11,788,948 B2 10/2023 Ota et al.
2003/0036092 A1* 2/2003 Iverson .................. C07K 16/00 435/7.1

(Continued)

FOREIGN PATENT DOCUMENTS

| | | | |
|---|---|---|---|
| JP | 2023002530 | A | 1/2023 |
| WO | WO2012000102 | A1 | 1/2012 |
| WO | WO2023042647 | A1 | 3/2023 |

OTHER PUBLICATIONS

Csomos, et al "Partial RAG deficiency in humans induces dysregulated peripheral lymphocyte development and humoral tolerance defect with accumulation of T-bet+ B cells", Nature Immunology, vol. 23, Aug. 2022, 1256-1272.

(Continued)

*Primary Examiner* — Yi Yang
(74) *Attorney, Agent, or Firm* — Bret E. Field; BOZICEVIC, FIELD & FRANCIS LLP

(57) ABSTRACT

Aspects of the present disclosure include methods for label-free particle sorting. Methods according to certain embodiments include measuring light from a sample having label-free particles in a flow stream, generating an image of one or more of the particles from the measured light, calculating image parameters from the generated image of the one or more particles and generating a particle sort decision based on the calculated image parameters. In some embodiments, sorting gates are determined based on image parameters calculated from the particle and ground-truth image classification parameters. Systems and integrated circuit devices (e.g., a field programmable gate array) for practicing the subject methods are also described. Non-transitory computer readable storage medium are also provided.

17 Claims, 24 Drawing Sheets

(56) References Cited

U.S. PATENT DOCUMENTS

| | | | | |
|---|---|---|---|---|
| 2017/0052106 | A1* | 2/2017 | Hennig | G06V 20/698 |
| 2017/0307502 | A1* | 10/2017 | Mason | B01J 19/0046 |
| 2018/0286038 | A1 | 10/2018 | Bahram et al. | |
| 2020/0309671 | A1* | 10/2020 | Lin | G06T 7/136 |
| 2021/0156788 | A1 | 5/2021 | Lo et al. | |
| 2021/0208056 | A1* | 7/2021 | Tang | G06N 3/08 |
| 2021/0270718 | A1* | 9/2021 | Roberts | G01N 15/1459 |

OTHER PUBLICATIONS

Valente, et al. "Novel mouse models based on intersectional genetics to identify and characterize plasmacytoid dendritic cells", Nature Immunology, vol. 24, Apr. 2023, 714-728.

Bonavia, et al. "Integrated machine learning approaches for flow cytometric quantification of myeloidderived suppressor cells in acute sepsis", Frontiers in Immunology, 2022, 10 pages.

BD Life Sciences, "Computational sorting with HyperFinder, FlowJo™ Software and BD FACSDiva™ Software", 2021, 13 pages.

Ota, et al. "Ghost cytometry", Science 360, 1246-1251 (2018).

Nitta, et al. "Intelligent Image-Activated Cell Sorting", Cell 175, 1-11, Sep. 20, 2018.

Roogers "NIH Flow cytometry group presentation", ThinkCyte, 2023, 5 Pages.

Wagatsuma, et al. "Characterization and label-free isolation of phenotypically defined human immune cells using Ghost Cytometry, a novel AI-powered high-content flow cytometry technology", Science, 2018, 2 pages.

"ThinkCyte, Inc.: Machine vision-based cell sorting transforms cell therapy and drug discovery" Nature, 2021, 1 page.

* cited by examiner

Purity check of activated T cells

Purity check of non-activated T cells

Purity check of dead cells

Purity check of live cells

METHODS FOR LABEL-FREE CELL SORTING AND SYSTEMS FOR SAME

INTRODUCTION

Flow-type particle sorting systems, such as sorting flow cytometers, are used to sort particles in a fluid sample based on at least one measured characteristic of the particles. In a flow-type particle sorting system, particles, such as analyte-bound beads or individual cells in a fluid suspension are passed in a stream by a detection region in which a sensor detects particles contained in the stream of the type to be sorted. The sensor, upon detecting a particle of the type to be sorted, triggers a sorting mechanism that selectively isolates the particle of interest.

Particle sensing typically is carried out by passing the fluid stream by a detection region in which the particles are exposed to irradiating light, from one or more lasers, and fluorescence from the particles is measured. Particles or components thereof can be labeled with fluorescent dyes to facilitate detection, and a multiplicity of different particles or components may be simultaneously detected by using spectrally distinct fluorescent dyes to label the different particles or components. Detection is carried out using one or more photosensors to facilitate the independent measurement of the fluorescence of each distinct fluorescent dye.

Using data generated from the detected light, distributions of the components can be recorded and where desired material may be sorted. To sort particles in the sample, a drop charging mechanism charges droplets of the flow stream containing a particle type to be sorted with an electrical charge at the break-off point of the flow stream. Droplets are passed through an electrostatic field and are deflected based on polarity and magnitude of charge on the droplet into one or more collection containers. Uncharged droplets are not deflected by the electrostatic field.

SUMMARY

Aspects of the present disclosure include methods for label-free particle sorting. Methods according to certain embodiments include measuring light from a sample having label-free particles in a flow stream, generating an image of one or more of the particles from the measured light, calculating image parameters from the generated image of the one or more particles and generating a particle sort decision based on the calculated image parameters. In some embodiments, sorting gates are determined based on image parameters calculated from the particle and ground-truth image classification parameters. Systems and integrated circuit devices (e.g., a field programmable gate array) for practicing the subject methods are also described. Non-transitory computer readable storage medium are also provided.

In embodiments, image parameters are calculated from generated images of the label-free particles in the flow stream. In some instances, the image parameters include one or more of center of mass, delta center of mass, diffusivity, eccentricity, long axis moment, maximum intensity, radial moment, short axis moment, size, total intensity, light loss by the particle, forward scattered light by the particle and side scattered light by the particle. In some instances, particles from the sample are classified based on one or more of the calculated image parameters. In some instances, methods include classifying particles using 5 or more calculated image parameters.

In some embodiments, particles are classified by comparing one or more of the calculated image parameters with ground-truth image classification parameters. In some instances, classifying the particle is based on a threshold between the calculated image parameters of the particle and the ground-truth image classification parameters. In some instances, methods include further determining ground-truth image classification parameters. In certain instances, the ground-truth image classification parameters are determined by contacting particles from the sample with one or more fluorescent labels, irradiating the fluorescently labelled particles with a light source, measuring fluorescence from the irradiated particles, identifying the particles from the sample based on the measured fluorescence, determining image parameters of the identified particles and generating ground-truth image classification parameters for the identified particles. In some instances, the particles are contacted with 4 or more different fluorescent labels. In some instances, methods include generating an image of the fluorescently labelled particles. In certain instances, the images are generated from frequency-encoded data signals. In some embodiments, the ground-truth image classification parameters are generated from the image of the fluorescently labelled particles.

In some embodiments, the ground-truth image classification parameters use a dynamic algorithm that updates based on determined image parameters of the fluorescently labelled particles. In some instances, the imaging parameters generated from the fluorescently-labelled particles are used in a machine-learning algorithm to generate the ground-truth image classification parameters. In some instances, the generated images from the fluorescently-labelled particles are used as training data for generating the ground-truth image classification parameters.

In some instances, classifying particles of the sample includes assigning the particle to one or more particle population clusters. In some instances, particles are assigned to a particle population cluster based on the comparison between the ground-truth image classification parameters of each particle population cluster and the calculated image parameters of the particles. In some embodiments, one or more sorting gates are determined for the classified particles of the sample. In some instances, the sorting gates are determined using the ground-truth image classification parameters of each particle population cluster. In some instances, the one or more sorting gates capture particles of a target particle population cluster and exclude particles of a non-target particle population cluster. In some instances, the sorting gates maximize the inclusion yield of particles of a target particle population cluster. In some instances, the sorting gates maximize the exclusion of particles of a non-target particle population cluster. In some instances, the sorting gates exclude particles of a non-target particle population cluster based on a calculated Mahalanobis distance from the ground-truth image classification parameters of each particle population cluster. In certain embodiments, generating the sorting gates includes calculating an FB score, where the FB score is a weighted harmonic mean of the inclusion of particles of a target particle population cluster and the exclusion of particles of a non-target particle population cluster. In certain instances, the generated sorting gates have an FB score of 1 or more. In certain instances, the generated sorting gates have an FB score of less than 1. In some instances, particle sort decision uses 8 sorting gates or less, such as 4 sorting gates or less.

In some embodiments, methods include irradiating the sample with a light source. In some instances, the sample is irradiated by the light source in a flow stream. In some instances, the light source includes one or more lasers. In some instances, light is detected with a light detection system having a plurality of photodetectors. In some embodiments, one or more of the photodetectors is a photomultiplier tube. In some embodiments one or more of the photodetectors is a photodiode (e.g., an avalanche photodiode, APD). In certain embodiments, the light detection system includes a photodetector array, such as a photodetector array having a plurality of photodiodes or charged coupled devices (CCDs).

Aspects of the present disclosure also include systems for practicing the subject methods. Systems according to certain embodiments include a light source configured to irradiate label-free particles of a sample, a light detection system having a plurality of photodetectors for measuring light from the particles and a processor with memory operably coupled to the processor where the memory includes instructions stored thereon, which when executed by the processor, cause the processor to generate an image of one or more of the particles from the measured light, calculate image parameters from the generated image of the particles and generate a particle sort decision based on the calculated image parameters.

In some embodiments, the memory includes instructions to classify the particle based on one or more of the calculated image parameters. In some instances, the memory includes instructions for classifying the particle using 5 or more calculated image parameters. In some instances, the image parameters calculated for the particle include center of mass, delta center of mass, diffusivity, eccentricity, long axis moment, maximum intensity, radial moment, short axis moment, size, total intensity, light loss by the particle, forward scattered light by the particle, side scattered light by the particle and combinations thereof.

In some embodiments, the memory includes instructions to classify the particle by comparing one or more of the calculated image parameters with ground-truth image classification parameters. In some instances, the memory includes instructions to classify the particle based on a threshold between the calculated image parameters of the particle and the ground-truth image classification parameters. In some embodiments, the memory includes instructions for determining the ground-truth image classification parameters. In some instances, the memory includes instructions stored thereon, which when executed by the processor, cause the processor to irradiate fluorescently labelled particles from the sample with the light source, measure fluorescence from the irradiated particles, identify the particles from the sample based on the measuring fluorescence, determine image parameters of the identified particles and generate ground-truth image classification parameters for the identified particles. In some instances, the memory includes instructions for generating the ground-truth image classification parameters from images of the fluorescently labelled particles.

In some embodiments, the memory includes instructions for generating the ground-truth image classification parameters using a dynamic algorithm, such as where the classification parameters are updated based on determined image parameters of the fluorescently labelled particles. In some instances, the memory includes a machine learning algorithm for generating the ground-truth image classification parameters, such as where the determined image parameters are used as training data for the machine learning algorithm. In some instances, the generated images are used as training data for the machine learning algorithm.

In some embodiments, the memory includes instructions for classifying particles of the sample by assigning the particle to one or more particle population clusters. In some instances, the memory includes instructions for assigning particles to a particle population cluster based on a comparison between the ground-truth image classification parameters of each particle population cluster and the calculated image parameters of the particles. In some embodiments, the memory includes instructions for generating sorting gates using the ground-truth image classification parameters of each particle population cluster. In some instances, the one or more sorting gates capture particles of a target particle population cluster and exclude particles of a non-target particle population cluster. In some instances, the sorting gates maximize the inclusion yield of particles of a target particle population cluster. In some instances, the sorting gates maximize the exclusion of particles of a non-target particle population cluster. In some instances, the memory includes instructions for determining the sorting gates by excluding particles of a non-target particle population cluster based on a calculated Mahalanobis distance from the ground-truth image classification parameters of each particle population cluster. In certain embodiments, the memory includes instructions for generating the sorting gates by calculating an FB score, where the FB score is a weighted harmonic mean of the inclusion of particles of a target particle population cluster and the exclusion of particles of a non-target particle population cluster. In certain instances, the generated sorting gates have an FB score of 1 or more. In certain instances, the generated sorting gates have an FB score of less than 1. In some instances, particle sort decision uses 8 sorting gates or less, such as 4 sorting gates or less.

In certain embodiments, systems include a display for displaying a graphical user interface. In some instances, the graphical user interface is configured for manually inputting one or more of the sorting gates. In some instances, the sorting gates are manually input into the graphical user interface by drawing sorting gates on a scatter plot of the particle population clusters. In some instances, the sorting gate is a hyper-rectangular sorting gate.

Non-transitory computer readable storage medium having instructions with algorithm for label-free sorting of particles in a sample are also described. Non-transitory computer readable storage medium according to certain embodiments have algorithm for measuring light from a sample comprising label-free particles in a flow stream, algorithm for generating an image of one or more of the particles from the measured light, algorithm for calculating image parameters from the generated image of the one or more particles and algorithm for generating a particle sort decision based on the calculated image parameters. In some instances, the image parameters include one or more of center of mass, delta center of mass, diffusivity, eccentricity, long axis moment, maximum intensity, radial moment, short axis moment, size, total intensity, light loss by the particle, forward scattered light by the particle and side scattered light by the particle. In some instances, particles from the sample are classified based on one or more of the calculated image parameters. In some instances, the non-transitory computer readable storage medium includes algorithm for classifying the particle based on 5 or more calculated image parameters.

In some instances, the non-transitory computer readable storage medium includes algorithm for classifying the particle by comparing one or more of the calculated image parameters with ground-truth image classification parameters. In some instances, the non-transitory computer readable storage medium includes algorithm for classifying the particle based on a threshold between the calculated image parameters of the particle and the ground-truth image classification parameters. In some instances, the non-transitory computer readable storage medium includes algorithm for determining the ground-truth image classification parameters. In certain instances, the non-transitory computer readable storage medium includes algorithm for contacting particles from the sample with one or more fluorescent labels, algorithm for irradiating the fluorescently labelled particles with a light source, algorithm for measuring fluorescence from the irradiated particles, algorithm for identifying the particles from the sample based on the measuring fluorescence, algorithm for determining image parameters of the identified particles and algorithm for generating ground-truth image classification parameters for the identified particles. In some instances, the particles are labeled with 4 or more different fluorophores. In some instances, the non-transitory computer readable storage medium includes algorithm for generating the images of the labelled particles from frequency-encoded data signals. In some instances, the non-transitory computer readable storage medium includes algorithm for generating, the ground-truth image classification parameters from the image of the fluorescently labelled particles.

In some embodiments, the non-transitory computer readable storage medium is programmed with a dynamic algorithm that updates based on determined image parameters of the fluorescently labelled particles. In some instances, the non-transitory computer readable storage medium is programmed with a machine-learning algorithm to generate the ground-truth image classification parameters from the fluorescently-labelled particles. In some instances, the generated images from the fluorescently-labelled particles are used as training data for generating the ground-truth image classification parameters.

In some embodiments, the non-transitory computer readable storage medium includes algorithm for classifying particles of the sample by assigning the particle to one or more particle population clusters. In some instances, the non-transitory computer readable storage medium includes algorithm for assigning a particle to a particle population cluster based on the comparison between the ground-truth image classification parameters of each particle population cluster and the calculated image parameters of the particles. In certain embodiments, the non-transitory computer readable storage medium includes algorithm for determining one or more sorting gates for the classified particles of the sample. In some instances, the non-transitory computer readable storage medium includes algorithm for determining the one or more sorting gates which capture particles of a target particle population cluster and exclude particles of a non-target particle population cluster. In some instances, the non-transitory computer readable storage medium includes algorithm for determining sorting gates using the ground-truth image classification parameters of each particle population cluster. In some instances, the sorting gates maximize the inclusion yield of particles of a target particle population cluster. In some instances, the sorting gates maximize the exclusion of particles of a non-target particle population cluster. In some instances, the non-transitory computer readable storage medium includes algorithm for determining sorting gates which exclude particles of a non-target particle population cluster based on a calculated Mahalanobis distance from the ground-truth image classification parameters of each particle population cluster. In some instances, the non-transitory computer readable storage medium includes algorithm for calculating an FB score, where the FB score comprises a weighted harmonic mean of the inclusion of particles of a target particle population cluster and the exclusion of particles of a non-target particle population cluster. In certain instances, the generated sorting gates have an FB score of 1 or more. In certain instances, the generated sorting gates have an FB score of less than 1. In some instances, particle sort decision uses 8 sorting gates or less, such as 4 sorting gates or less.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
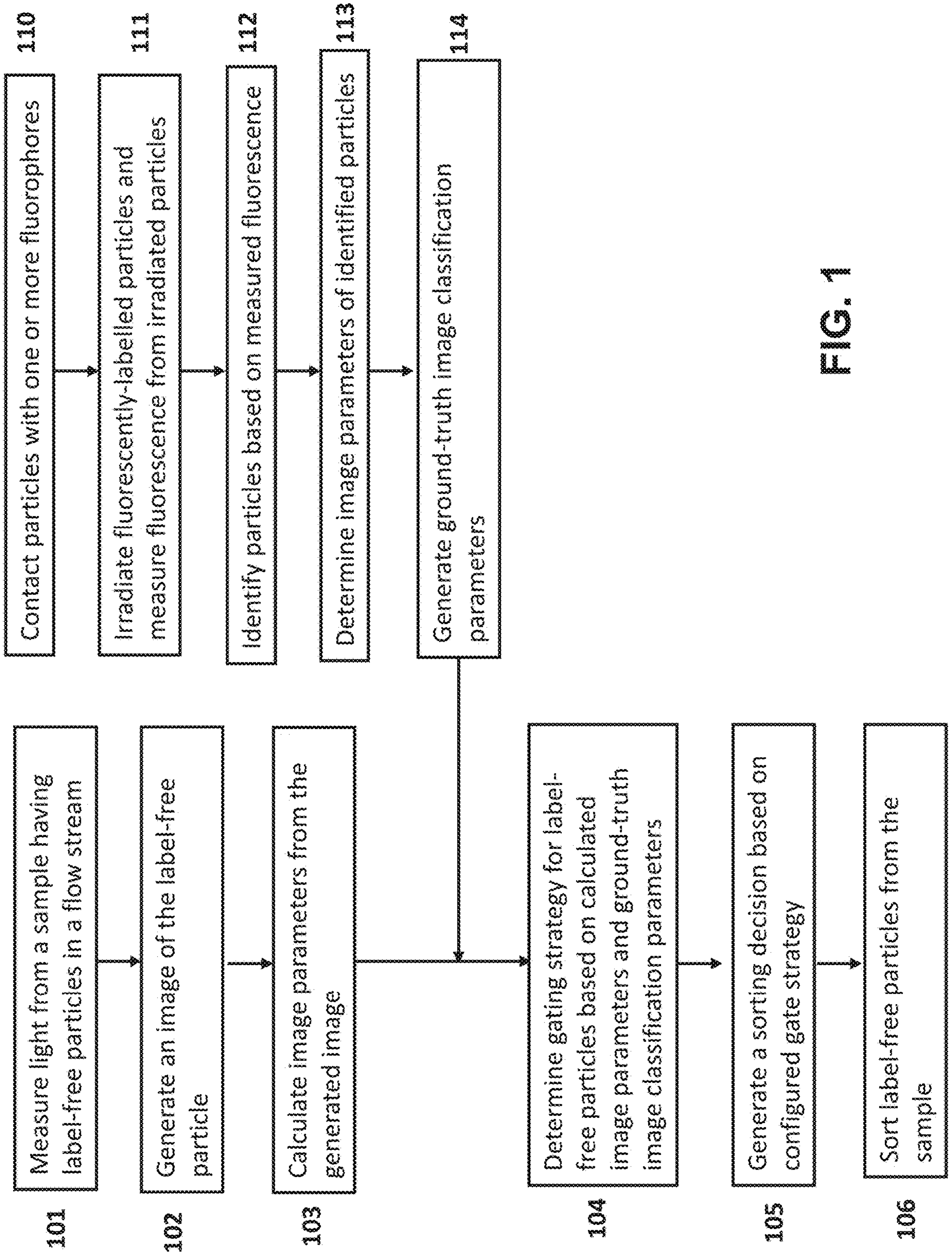
FIG. 1 depicts a flowchart for sorting label-free particles according to certain embodiments.

Aspects of the present disclosure include methods for label-free particle sorting. Methods according to certain embodiments include measuring light from a sample having label-free particles in a flow stream, generating an image of one or more of the particles from the measured light, calculating image parameters from the generated image of the one or more particles and generating a particle sort decision based on the calculated image parameters. In some embodiments, sorting gates are determined based on image parameters calculated from the particle and ground-truth image classification parameters. Systems and integrated circuit devices (e.g., a field programmable gate array) for practicing the subject methods are also described. Non-transitory computer readable storage medium are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention.

The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about". The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "mean" or "step" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides for label-free sorting of particles of a sample. In further describing embodiments of the disclosure, methods for generating image parameters, ground-truth image classification parameters and sorting gates are first described in greater detail. Next, systems, integrated circuited devices and non-transitory computer readable storage medium having programming to practice the subject methods, by calculating sorting gates for sorting label-free particles of a sample are also provided.

Methods for Sorting Label-Free Particles of a Sample

Aspects of the present disclosure include methods for label-free particle sorting. The subject methods provide for sorting particles without any type of labelling, such as with fluorophores. The term "labelling" is used herein in its conventional sense to refer to the coupling to or conjugation of the particles of the sample to one or more detection components, such as components that are detectable by luminescence (e.g., fluorescence, phosphorescence, etc.), contrast agents, radioisotopes, among others. For example, labelling may include coupling the particles to the detection component by non-covalent interactions such as hydrogen bonding, dipole-dipole bonding, ionic bonding or through one or more covalent bonds. The term "label-free" is used herein in its conventional sense to refer to the absence of a detection component that is added, coupled or otherwise conjugated (e.g., through one or more non-covalent or covalent bonds) to the particles of interest in the sample. As such, methods provide for generating a sorting strategy and sorting particles of the sample that are not bonded or coupled to detection markers such as fluorophores, radioisotopes or contrast agents. In some embodiments, particles of the sample having a coupled or conjugated detection marker (e.g., fluorophores) are present in the sample in an amount of 5% or less, such as 2% or less, such as 1% or less, such as 0.5% or less, such as 0.1% or less, such as 0.05% or less, such as 0.01% or less, such as 0.005% or less, such as 0.001% or less, such as 0.0005% or less, such as 0.0001% or less, such as 0.00005% or less, such as 0.00001% or less and including in an amount of 0.000001% or less. In certain instances, there are no particles in the sample that have a detection marker coupled to or conjugated to the particle.

In some instances, label-free sorting methods of the present disclosure provide for isolating rare cell populations which can be damaged by labelling with fluorophores or reduce the quality of viable cells. In some instances, label-free sorting provides for isolating cells of a sample such that cell quality remains suitable for downstream transcriptomic analysis as well as for downstream cell manufacturing, such as when used for adoptive cellular therapy or drug discovery. As described in greater detail below, particles of the sample are sorted based on image parameters that are generated from an image of the particles in the sample. As such, the particles do not need to be subjected to treatment with any fluorescent or other types of markers for identifying and isolation of the particles.

In some embodiments, the subject methods provide for increasing the sensitivity and precision of classifying particles without the use of a detectable label. In some instances, the precision of clustering particles of a sample is increased. In certain instances, the precision of particle sorting gates is increased when applying the particle sorting algorithm described herein. In some instances, methods provide for generating image parameters which can be used to improve classification in cluster analysis, including where no changes are made to the hardware components (e.g., photodetectors) of a particle analyzer system. In some instances, the determined image parameters can increase the precision of label-free particle classification by 5% or more, such as by 10% or more, such as by 15% or more, such as by 25% or more, such as by 50% or more, such as by 75% or more and including by 99% or more. In some embodiments, the determined image parameters can be used to adjust and optimize thresholds for a trigger metric in detecting particles of a sample. For example, the number of particles that are misclassified (e.g., where the particle is incorrectly identified or categorized) when applying the image parameters generated by the subject methods in a cluster analysis is reduced by 5% or more, such as by 10% or more, such as by 15% or more, such as by 25% or more, such as by 50% or more, such as by 75% or more and including by 99% or more.

In embodiments, a sorting strategy is generated for label-free particles of a sample based on image parameters determined from one or more images of the particles. In some instances, the image parameters are determined only from the images of the particles and not from another data source, such as for example data signal waveforms. In some instances, the image parameters are determined using a combination of a generated image of the particles and data signal waveforms generated in response to measured light from irradiated particles.

In practicing the subject methods according to certain embodiments, light from a sample (e.g., a sample is irradiated with a light source) having label-free particles in a flow stream is measured with a light detection system having a photodetector. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In some embodiments, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:$YVO_4$ laser, Nd:$yCa_4O(BO_3)_3$ laser, Nd:YCOB laser, titanium sapphire laser, thulim YAG laser, ytterbium YAG laser, ytterbium$_2O_3$ laser or cerium doped lasers and combinations thereof.

The sample may be irradiated with one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In certain embodiments, methods include irradiating the sample with two or more beams of frequency shifted light. As described above, a light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

In certain instances, the flow stream is irradiated with a plurality of beams of frequency-shifted light and particles in the flow stream are imaged such as described in Diebold, et al. *Nature Photonics Vol.* 7(10); 806-810 (2013), as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/

0328826; 2017/0350803; 2018/0275042; 2019/0376895 and 2019/0376894 the disclosures of which are herein incorporated by reference.

As discussed above, light from particles in the sample is conveyed to a light detection system as described in greater detail below and measured by the plurality of photodetectors. In some embodiments, methods include measuring the collected light over a range of wavelengths (e.g., 200 nm-1000 nm). For example, methods may include collecting spectra of light over one or more of the wavelength ranges of 200 nm-1000 nm. In yet other embodiments, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, light from the sample is measured 2 or more times, with the data in certain instances being averaged.

Light from the sample may be measured at one or more wavelengths of, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring the collected light at 400 or more different wavelengths.

In some embodiments, methods include further adjusting the light from the sample before detecting the light. For example, the light from the sample source may be passed through one or more lenses, mirrors, pinholes, slits, gratings, light refractors, and any combination thereof. In some instances, the collected light is passed through one or more focusing lenses, such as to reduce the profile of the light. In other instances, the emitted light from the sample is passed through one or more collimators to reduce light beam divergence.

In embodiments, one or more images of the particles in the sample are generated from the measured light. The image may be generated from detected light absorption, detected light scatter, detected light emission or any combination thereof. In some instances, the image is generated from light absorption detected from the sample, such as from a brightfield light detector. In these instances, the image is generated based on brightfield image data from the particle in the flow stream. In other instances, the image is generated from light scatter detected from the sample, such as from a side scatter detector, a forward scatter detector or a combination of a side scatter detector and forward scatter detector. In these instances, the image is generated based on scattered light image data. In yet other instances, the image is generated from emitted light from the sample. In still other instances, the image is generated from a combination of detected light absorption, detected light scatter and detected light emission.

One or more images may be generated from the measured light. In some embodiments, a single image is generated for each particle from each form of detected light. In other embodiments, a plurality of images are generated for each particle, such as 2 or more, such as 3 or more, such as 5 or more, such as 10 or more and including 25 or more images of the particle. For example, a first image of the particle is generated from detected light absorption; a second image of the cell is generated from detected light scatter and a third image of the cell is generated from detected light emission. In other embodiments, two or more images are generated from each form of detected light, such as 3 or more, such as 4 or more, such as 5 or more and including 10 or more images or a combination thereof.

In some embodiments, frequency-encoded data (e.g., frequency-encoded spatial data) is generated from the measured light from the particles in the flow stream. In some instances, one or more images are generated from the frequency-encoded data. The frequency-encoded data may be generated in one or more detection channels, such as 2 or more, such as 3 or more, such as 4 or more, such as 5 or more, such as 6 or more and including 8 or more detection channels. In some embodiments, the frequency-encoded data includes data components taken (or derived) from light from different detectors, such as detected light absorption or detected light scatter. In some instances, the frequency-encoded data is phase-corrected. In some instances, the frequency-encoded data used to generate images of the particles is phase corrected by performing a transform on the frequency-encoded data. In one example, the frequency-encoded data is phase corrected by performing a Fourier transform (FT) of the frequency-encoded data. In another example, the frequency-encoded is phase corrected by performing a discrete Fourier transform (DFT) of the frequency-encoded data. In yet another example, the frequency-encoded data is phase corrected by performing a short time Fourier transform (STFT) of the frequency-encoded data. In certain embodiments, methods include performing a transform of the frequency encoded data without performing any mathematical imaginary computations (i.e., only performing computations for mathematical real computations of the transform) to generate an image from the frequency-encoded data.

In some instances, methods include generating one or more greyscale images of the particle. The term "greyscale" is used herein in its conventional sense to refer to images of the cell in the flow stream that are composed of varying shades of gray that are based on the intensity of light at each pixel. In some embodiments, a pixel intensity threshold is determined from the greyscale image where the pixel intensity threshold value is used to convert each pixel into a binary value that is used to generate the image of the particle. In certain instances, the image of the particle is a binary pixel image of the particle such as where each pixel is assigned a binary pixel value of 1 (e.g., where the intensity of the pixel exceeds a predetermined threshold) or a binary pixel value of 0 (e.g., where the intensity of the pixel falls below a predetermined threshold).

In embodiments, one or more image parameters are calculated from the generated images of the particles. In some instances, a center of mass image parameter is calculated from the generated image. In some instances, a delta center of mass image parameter is calculated from the generated image. In some instances, a diffusivity image parameter is calculated from the generated image. In some instances, an eccentricity image parameter is calculated from the generated image. In some instances, a long axis moment image parameter is calculated from the generated image. In some instances, a maximum intensity image parameter is calculated from the generated image. In some instances, a radial moment image parameter is calculated from the generated image. In some instances, a short axis moment image parameter is calculated from the generated image. In some instances, a particle size image parameter is calculated from the generated image. In some instances, a total intensity image parameter is calculated from the generated image. In some instances, a particle light loss image parameter is calculated from the generated image. In some instances, a forward scattered light image parameter is calculated from the generated image. In some instances, a side scattered light image parameter is calculated from the generated image. In some instances, an image moment is calculated from the generated image. The term "image moment" is used herein in its conventional sense to refer to a weighted average of pixel intensities in an image. In some instances, the center of mass may be calculated from the image moment of the image. In other instances, the orientation of the cell may be calculated from the image moment of the image. In still other instances, the eccentricity of the cell may be calculated from the image moment of the image.

In certain embodiments, imaging parameters calculated from the generated image for use in generating a gating strategy (as described below) summarized in Table 1.

TABLE 1

| | Imaging parameters |
|---|---|
| 1 | FSC-A :: FSC-A |
| 2 | FSC-H :: FSC-H |
| 3 | FSC-T :: FSC-T |
| 4 | FSC-W :: FSC-W |
| 5 | SSC (Imaging)-A :: SSC (Imaging)-A |
| 6 | SSC (Imaging)-H :: SSC (Imaging)-H |
| 7 | SSC (Imaging)-T :: SSC (Imaging)-T |
| 8 | SSC (Imaging)-W :: SSC (Imaging)-W |
| 9 | SSC (Violet)-A :: SSC (Violet)-A |
| 10 | SSC (Violet)-H :: SSC (Violet)-H |
| 11 | SSC (Violet)-T :: SSC (Violet)-T |
| 12 | SSC (Violet)-W :: SSC (Violet)-W |
| 13 | Center of Mass (X) (FSC) |
| 14 | Center of Mass (X) (LightLoss (Imaging)) |
| 15 | Center of Mass (X) (SSC (Imaging)) |
| 16 | Center of Mass (Y) (FSC) |
| 17 | Center of Mass (Y) (LightLoss (Imaging)) |
| 18 | Center of Mass (Y) (SSC (Imaging)) |
| 19 | Delta CoM (LightLoss (Imaging)_FSC) |
| 20 | Delta CoM (SSC (Imaging)_FSC) |
| 21 | Delta CoM (SSC (Imaging)_LightLoss (Imaging)) |
| 22 | Diffusivity (FSC) |
| 23 | Diffusivity (LightLoss (Imaging)) |
| 24 | Diffusivity (SSC (Imaging)) |
| 25 | Eccentricity (FSC) |
| 26 | Eccentricity (LightLoss (Imaging)) |
| 27 | Eccentricity (SSC (Imaging)) |
| 28 | LightLoss (Imaging)-A :: LightLoss (Imaging)-A |
| 29 | LightLoss (Imaging)-H :: LightLoss (Imaging)-H |
| 30 | LightLoss (Imaging)-T :: LightLoss (Imaging)-T |
| 31 | LightLoss (Imaging)-W :: LightLoss (Imaging)-W |
| 32 | LightLoss (Violet)-A :: LightLoss (Violet)-A |
| 33 | LightLoss (Violet)-H :: LightLoss (Violet)-H |
| 34 | LightLoss (Violet)-T :: LightLoss (Violet)-T |
| 35 | LightLoss (Violet)-W :: LightLoss (Violet)-W |
| 36 | Long Axis Moment (FSC) |
| 37 | Long Axis Moment (LightLoss (Imaging)) |
| 38 | Long Axis Moment (SSC (Imaging)) |
| 39 | Max Intensity (FSC) |
| 40 | Max Intensity (LightLoss (Imaging)) |
| 41 | Max Intensity (SSC (Imaging)) |
| 42 | Radial Moment (FSC) |
| 43 | Radial Moment (LightLoss (Imaging)) |
| 44 | Radial Moment (SSC (Imaging)) |

TABLE 1-continued

| | Imaging parameters |
|---|---|
| 45 | Short Axis Moment (FSC) |
| 46 | Short Axis Moment (LightLoss (Imaging)) |
| 47 | Short Axis Moment (SSC (Imaging)) |
| 48 | Size (FSC) |
| 49 | Size (LightLoss (Imaging)) |
| 50 | Size (SSC (Imaging)) |
| 51 | Total Intensity (FSC) |
| 52 | Total Intensity (LightLoss (Imaging)) |
| 53 | Total Intensity (SSC (Imaging)) |

In some embodiments, the particle is classified based on one or more of the calculated image parameters. In some instances, the particle is classified using a plurality of calculated image parameters, such as with a combination of 2 or more image parameters, such as 3 or more, such as 4 or more, such as 5 or more, such as 6 or more, such as 7 or more, such as 8 or more, such as 9 or more, such as 10 or more, such as 15 or more, such as 20 or more, such as 25 or more, such as 30 or more, such as 40 or more and including classifying the particle based on 50 or more image parameters that were determined from the generated image of the particle.

In some instances, the particle is classified by comparing one or more of the calculated image parameters with ground-truth image classification parameters. The term "ground-truth" is used herein to refer to image parameters previously determined for identified or classified particles, such as image parameters determined using fluorescently-labelled particles as described in greater detail below. In certain embodiments, methods include generating ground-truth classification parameters for particles of the sample. In some instances, particles from the sample (e.g., particles from a portion of the sample) are contacted with one or more fluorophores to generate a composition which contains fluorescently-labelled particles. The particles may be labelled with one or more fluorophores, such as 2 or more, such as 3 or more, such as 4 or more, such as 5 or more and including 8 or more fluorophores.

Fluorochromes of interest may include, but are not limited to, a bodipy dye, a coumarin dye, a rhodamine dye, an acridine dye, an anthraquinone dye, an arylmethane dye, a diarylmethane dye, a chlorophyll containing dye, a triarylmethane dye, an azo dye, a diazonium dye, a nitro dye, a nitroso dye, a phthalocyanine dye, a cyanine dye, an asymmetric cyanine dye, a quinon-imine dye, an azine dye, an eurhodin dye, a safranin dye, an indamin, an indophenol dye, a fluorine dye, an oxazine dye, an oxazone dye, a thiazine dye, a thiazole dye, a xanthene dye, a fluorene dye, a pyronin dye, a fluorine dye, a rhodamine dye, a phenanthridine dye, squaraines, bodipys, squarine roxitanes, naphthalenes, coumarins, oxadiazoles, anthracenes, pyrenes, acridines, arylmethines, or tetrapyrroles and a combination thereof. In certain embodiments, conjugates may include two or more dyes, such as two or more dyes selected from a bodipy dye, a coumarin dye, a rhodamine dye, an acridine dye, an anthraquinone dye, an arylmethane dye, a diarylmethane dye, a chlorophyll containing dye, a triarylmethane dye, an azo dye, a diazonium dye, a nitro dye, a nitroso dye, a phthalocyanine dye, a cyanine dye, an asymmetric cyanine dye, a quinon-imine dye, an azine dye, an eurhodin dye, a safranin dye, an indamin, an indophenol dye, a fluorine dye, an oxazine dye, an oxazone dye, a thiazine dye, a thiazole dye, a xanthene dye, a fluorene dye, a pyronin dye, a fluorine dye, a rhodamine dye, a phenanthridine dye, squaraines, bodipys, squarine roxitanes, naphthalenes, coumarins, oxadiazoles, anthracenes, pyrenes, acridines, arylmethines, or tetrapyrroles and a combination thereof.

In certain embodiments, fluorochromes of interest may include but are not limited to fluorescein isothiocyanate (FITC), a phycoerythrin (PE) dye, a peridinin chlorophyll protein-cyanine dye (e.g., PerCP-Cy5.5), a phycoerythrin-cyanine (PE-Cy) dye (PE-Cy7), an allophycocyanin (APC) dye (e.g., APC-R700), an allophycocyanin-cyanine dye (e.g., APC-Cy7), a coumarin dye (e.g., V450 or V500). In certain instances, fluorochromes may include one or more of 1,4-bis-(o-methylstyryl)-benzene (bis-MSB 1,4-bis[2-(2-methylphenyl) ethenyl]-benzene), a C510 dye, a C6 dye, nile red dye, a T614 dye (e.g., N-[7-(methanesulfonamido)-4-oxo-6-phenoxychromen-3-yl]formamide), LDS 821 dye ((2-(6-(p-dimethylaminophenyl)-2,4-neopentylene-1,3,5-hexatrienyl)-3-ethylbenzothiazolium perchlorate), an mFluor dye (e.g., an mFluor Red dye such as mFluor 780NS).

Fluorochromes of interest may include, but are not limited to, Fluorescein, Hydroxycoumarin, Aminocoumarin, Methoxycoumarin, Cascade Blue, Pacific Blue, Pacific Orange, Lucifer yellow, NBD, R-Phycoerythrin (PE), PE-Cy5 conjugates, PE-Cy7 conjugates, Red 613, PerCP, Tru-Red, FluorX, BODIPY-FL, TRITC, X-Rhodamine, Lissamine Rhodamine B, Texas Red, Allophycocyanin (APC), APC-Cy7 conjugates, Cy2, Cy3, Cy3B, Cy3.5, Cy5, Cy5.5, Cy7, Hoechst 33342, DAPI, Hoechst 33258, SYTOX Blue, Chromomycin A3, Mithramycin, YOYO-1, Ethidium Bromide, Acridine Orange, SYTOX Green, TOTO-1, TO-PRO-1, Thiazole Orange, Propidium Iodide (PI), LDS 751, 7-AAD, SYTOX Orange, TOTO-3, TO-PRO-3, DRAQ5, Indo-1, Fluo-3, DCFH, DHR, SNARF, Y66H, Y66F, EBFP, EBFP2, Azurite, GFPuv, T-Sapphire, TagBFP, Cerulean, mCFP, ECFP, CyPet, Y66W, dKeima-Red, mKeima-Red, TagCFP, AmCyan1, mTFP1 (Teal), S65A, Midoriishi-Cyan, Wild Type GFP, S65C, TurboGFP, TagGFP, TagGFP2, AcGFP1, S65L, Emerald, S65T, EGFP, Azami-Green, ZsGreen1, Dronpa-Green, TagYFP, EYFP, Topaz, Venus, mCitrine, YPet, TurboYFP, PhiYFP, PhiYFP-m, ZsYellow1, mBanana, Kusabira-Orange, mOrange, mOrange2, mKO, TurboRFP, tdTomato, DsRed-Express2, TagRFP, DsRed monomer, DsRed2 ("RFP"), mStrawberry, TurboFP602, AsRed2, mRFP1, J-Red, mCherry, HcRed1, mKate2, Katushka (TurboFP635), mKate (TagFP635), TurboFP635, mPlum, mRaspberry, mNeptune, E2-Crimson, Monochlorobimane, Calcein, Alexa Fluor 350, Alexa Fluor 405, Alexa Fluor 430, Alexa Fluor 488, Alexa Fluor 500, Alexa Fluor 514, Alexa Fluor 532, Alexa Fluor 546, Alexa Fluor 555, Alexa Fluor 568, Alexa Fluor 594, Alexa Fluor 610, Alexa Fluor 633, Alexa Fluor 647, Alexa Fluor 660, Alexa Fluor 680, Alexa Fluor 700, Alexa Fluor 750, Alexa Fluor 790, and HyPer, or the like. In some embodiments, the fluorochromes are selected from: 7-AAD, Alexa Fluor 488, Alexa Fluor 647, Alexa Fluor 700, AmCyan, APC, APC-Cy7, APC-H7, APC-R700, BB660-P2, BB790-P, BUV395, BUV615, BUV661, BV570, BV605, BV650, BV711, BV750, BV786, BYG584-P, Calcein AM, Calcein Blue AM, CFSE, DAPI, DRAQ5, DRAQ7, FITC, Fluo-4 AM, FVS440UV, FVS450, FVS510, FVS520, FVS570, FVS575V, FVS620, FVS660, FVS700, FVS780, Indo-1 Hi, Indo-1 Lo, JC-1, MitoStatus Red, MitoStatus TMRE, Pacific Blue, PE, PE-CF594, PE-Cy5, PE-Cy7, PerCP, PerCP-Cy5.5, PI, R718, RB545, RB613, RB744, RB780, RY586, RY610, V450, V500, Via-Probe Green, Via-Probe Red, VPD450, Alexa Fluor 532, Alexa Fluor 561, Alexa Fluor 660, APC-eFluor 780, APC/Fire 750, APC/Fire 810, BV785, eBFP, eCFP, eFluor 450, eFluor 506, eFluor 660, eGFP, eYFP, Hoechst 33258, KIRAVIA Blue 520, mCherry, NFB510, NFB530, NFB555, NFB585, NFB610-70S, NFB660-120S, NFR660, NFR685, NFR700, NFR710, NFY570, NFY590, NFY610, NFY660, NFY690, NFY700, NFY730, Pacific Orange, PE-Cy5.5, PE-eFluor 610, PE/Dazzle 594, PE/Fire 640, PE/Fire 700, PE/Fire 810, PerCP-eFluor 710, SB436, SB600, SB645, SB702, SB780, Spark Blue 550, Spark Blue 574, Spark NIR 685, Spark UV 387, Spark Violet 423, Spark Violet 538, Spark YG 581, Spark YG 593, and tdTomato.

In some instances, the fluorochrome is a polymeric dye (e.g., fluorescent polymeric dyes). Fluorescent polymeric dyes that find use in the subject methods and systems are varied. In some instances of the method, the polymeric dye includes a conjugated polymer. Conjugated polymers (CPs) are characterized by a delocalized electronic structure which includes a backbone of alternating unsaturated bonds (e.g., double and/or triple bonds) and saturated (e.g., single bonds) bonds, where IT-electrons can move from one bond to the other. As such, the conjugated backbone may impart an extended linear structure on the polymeric dye, with limited bond angles between repeat units of the polymer. For example, proteins and nucleic acids, although also polymeric, in some cases do not form extended-rod structures but rather fold into higher-order three-dimensional shapes. In addition, CPs may form "rigid-rod" polymer backbones and experience a limited twist (e.g., torsion) angle between monomer repeat units along the polymer backbone chain. In some instances, the polymeric dye includes a CP that has a rigid rod structure. The structural characteristics of the polymeric dyes can have an effect on the fluorescence properties of the molecules.

Polymeric dyes of interest include, but are not limited to, those dyes described in U.S. Pat. Nos. 7,270,956; 7,629,448; 8,158,444; 8,227,187; 8,455,613; 8,575,303; 8,802,450; 8,969,509; 9,139,869; 9,371,559; 9,547,008; 10,094,838; 10,302,648; 10,458,989; 10,641,775 and 10,962,546 the disclosures of which are herein incorporated by reference in their entirety; and Gaylord et al., *J. Am. Chem. Soc.*, 2001, 123 (26), pp 6417-6418; Feng et al., *Chem. Soc. Rev.*, 2010,39, 2411-2419; and Traina et al., *J. Am. Chem. Soc.*, 2011, 133 (32), pp 12600-12607, the disclosures of which are herein incorporated by reference in their entirety. Specific polymeric dyes that may be employed include, but are not limited to, BD Horizon Brilliant™ Dyes, such as BD Horizon Brilliant™ Violet Dyes (e.g., BV421, BV510, BV605, BV650, BV711, BV786); BD Horizon Brilliant™ Ultraviolet Dyes (e.g., BUV395, BUV496, BUV737, BUV805); and BD Horizon Brilliant™ Blue Dyes (e.g., BB515) (BD Biosciences, San Jose, CA). Any fluorochromes that are known to a skilled artisan—including, but not limited to, those described above—or are yet to be discovered may be employed in the subject methods.

In some embodiments, the fluorescently-labelled particles are irradiated with a light source (e.g., as described above) and fluorescence is measured from the irradiated particles in one or more fluorescence photodetector channels, such as 2 or more, such as 3 or more, such as 4 or more, such as 8 or more, such as 16 or more, such as 32 or more and including in 64 different fluorescence photodetector channels. In some instances, one or more of light absorption and light scatter are also measured for the fluorescently-labelled particles.

In some embodiments, an image of the fluorescently-labelled particles is generated based on the measured fluorescence from the irradiated particles. In some instances, the image is generated using light absorption from the fluorescently-labelled particles. In some instances, the image is generated using light scatter (e.g., forward-scattered light and side-scattered light) from the fluorescently-labelled particles. In some instances, a plurality of images are generated of each fluorescently-labelled particle, such as where 2 or more images are generated for each particle based on the measured fluorescence, such as 3 or more, such as 4 or more, such as 5 or more and including 10 or more images.

In some embodiments, ground-truth image classification parameters are calculated using the images generated from the fluorescently-labelled particles. In some instances, a ground-truth center of mass image classification parameter is calculated from the image generated using the fluorescently-labelled particles. In some instances, a ground-truth delta center of mass image classification parameter is calculated from the image generated using the fluorescently-labelled particles. In some instances, a ground-truth diffusivity image classification parameter is calculated from the image generated using the fluorescently-labelled particles. In some instances, a ground-truth eccentricity image classification parameter is calculated from the generated image. In some instances, a ground-truth long axis moment image classification parameter is calculated from the image generated using the fluorescently-labelled particles. In some instances, a ground-truth maximum intensity image classification parameter is calculated from the image generated using the fluorescently-labelled particles. In some instances, a ground-truth radial moment image classification parameter is calculated from the image generated using the fluorescently-labelled particles. In some instances, a ground-truth short axis moment image classification parameter is calculated from the image generated using the fluorescently-labelled particles. In some instances, a ground-truth particle size image classification parameter is calculated from the image generated using the fluorescently-labelled particles. In some instances, a ground-truth total intensity image classification parameter is calculated from the image generated using the fluorescently-labelled particles. In some instances, a ground-truth particle light loss image classification parameter is calculated from the image generated using the fluorescently-labelled particles. In some instances, a ground-truth forward scattered light image classification parameter is calculated from the image generated using the fluorescently-labelled particles. In some instances, a ground-truth side scattered light image classification parameter is calculated from the image generated using the fluorescently-labelled particles. In some instances, a ground-truth image moment classification parameter is calculated from the image generated using the fluorescently-labelled particles.

In some embodiments, one or more of the ground-truth image classification parameters is calculated by inputting images of the fluorescently-labelled particles generated from measured fluorescence from the irradiated particles into a machine learning algorithm as one or more training data sets. In some instances, the machine learning algorithm is a dynamic algorithm that updates based on determined image parameters of the fluorescently labelled particles. Any convenient machine learning algorithm can be implemented where machine learning algorithms of interest can include, but are not limited to a linear regression algorithm, a logistic regression algorithm, a Naïve Bayes algorithm, a k-nearest neighbor (kNN) algorithm, a Random forest algorithm, decision tree algorithm, a support vector machine algorithm, a gradient boosting algorithm and a clustering algorithm. In certain embodiments, the machine learning algorithm is a neural network. In some instances, the machine learning algorithm is a neural network such as an artificial neural network, a convolutional neural network or a recurrent neural network. In certain instances, the machine learning algorithm is a python script.

In some instances, training data sets inputted into the machine learning algorithm have 2 or more images of the fluorescently-labelled particles, such as 3 or more, such as 5 or more, such as 10 or more, such as 15 or more, such as 20 or more, such as 25 or more, such as 50 or more, such as 100 or more, such as 250 or more, such as 500 or more, such as 750 or more and including inputting into the machine learning algorithm training data sets having 1000 or more images of the fluorescently-labelled particles. In certain instances, the training data sets may include one or more images of particle clusters, such as a particle cluster which forms a doublet in a generated data signal.

In some embodiments, ground-truth image classification parameters calculated from images of the fluorescently-labelled particles by the machine learning algorithm are determined for one or more photodetector channels of the light detection system. In certain instances, ground-truth image classification parameters are determined for all of the photodetector channels of the light detection system. For example, ground-truth image classification parameters of may be determined for the scattered light photodetector channels (e.g., forward-scattered light, side-scattered light), the light absorption photodetector channels and the fluorescence photodetector channels.

In some embodiments, an adjustment to one or more of the ground-truth image classification parameters is calculated. In some instances, calculating an adjustment to one or more of the ground-truth image classification parameters includes determining accuracy and loss statistics of the generated dynamic particle classification algorithm. In some instances, the accuracy and loss statistics of the dynamic particle classification algorithm is calculated by an iterative optimization approach. In certain instances, the iterative optimization approach is a first-order optimization algorithm. In some instances, the accuracy and loss statistics of the dynamic particle classification algorithm is calculated by a gradient descent algorithm. In certain instances, the accuracy and loss statistics of the dynamic particle classification algorithm is calculated by backpropagation. In some embodiments, methods include adjusting one or more of the ground-truth image classification parameters based on the calculated accuracy and loss statistics. In some instances, each one of the ground-truth image classification parameters is iteratively adjusted in each photodetector channel to converge on an optimized set of image classification parameters for the dynamic particle classification algorithm.

In some embodiments, methods include applying the determined ground-truth image classification parameters to classify label-free particles of a sample in a flow stream. In some instances, classifying label-free particles of the sample include assigning a label-free particle to a particle population cluster based on the comparison between the ground-truth image classification parameters of each particle population cluster and the calculated image parameters of the particle. As used herein, a "population", or "subpopulation" of classified label-free particles (e.g., cells) refers to a group of analytes that possess image parameters (for example, delta center of mass, radial moment, eccentricity) such that measured parameter data form a cluster in the data space. In embodiments, the population clusters may be formed using a plurality of different image parameters, such as, for instance 2 or more, 3 or more, 4 or more, 5 or more, 6 or more, 7 or more, 8 or more, 9 or more, 10 or more, and including 20 or more different image parameters. Thus, populations are recognized as clusters in the data. Conversely, each particle population cluster may be interpreted as corresponding to a compound population of a particular type of cell or analyte, although clusters that correspond to noise or background typically also are observed. A particle population cluster may be defined in a subset of the dimensions, e.g., with respect to a subset of the measured image parameters, which corresponds to compound populations that differ in only a subset of the measured image parameters or features extracted from the measurements of the cell or particle.

In some embodiments, methods include determining one or more sorting gates for the classified particles of the sample. The term "gate" is used herein in its conventional sense to refer to a classifier boundary identifying a subset of data of interest. In some instances, a gate can bound a group of events of particular interest. In addition, "gating" may refer to the process of classifying the data using a defined gate for a given set of data, where the gate can be one or more regions of interest combined with Boolean logic. In some embodiments, a gate defines a boundary for classifying populations based on the ground-truth image parameters. In some embodiments, a gate identifies particles exhibiting the same image parameters. Examples of methods for gating have been described in, for example, U.S. Pat. Nos. 4,845,653; 5,627,040; 5,739,000; 5,795,727; 5,962,238; 6,014,904; 6,944,338; and 8,990,047; the disclosures of which are herein incorporated by reference. In some embodiments, the gate bounds a particle population cluster from one or more different samples that has previously been determined (e.g., by a user), to correspond to properties of interest.

In some instances, the one or more sorting gates capture particles of a target particle population cluster and exclude particles of a non-target particle population cluster. In some instances, the sorting gates are determined using the ground-truth image classification parameters of each particle population cluster. In some instances, the sorting gates are configured to maximize the inclusion yield of the particles of a target particle population cluster, such as where the sorting gates are configured to generate an inclusion yield of particles of a target particle population cluster of 50% or more, such as 55% or more, such as 60% or more, such as 65% or more, such as 70% or more, such as 75% or more, such as 80% or more, such as 85% or more, such as 90% or more, such as 95% or more, such as 97% or more, such as 99% or more and including determining a sorting gate that is configured to generate an inclusion yield of particles of a target particle population cluster of 99.9% or more. In some instances, the sorting gates are configured to maximize the purity yield of the particles of a target particle population cluster, such as where the sorting gates are configured to generate a purity yield of particles of a target particle population cluster of 50% or more, such as 55% or more, such as 60% or more, such as 65% or more, such as 70% or more, such as 75% or more, such as 80% or more, such as 85% or more, such as 90% or more, such as 95% or more, such as 97% or more, such as 99% or more and including determining a sorting gate that is configured to generate a purity yield of particles of a target particle population cluster of 99.9% or more.

In some instances, the sorting gates are configured to maximize the exclusion of particles of a non-target particle population, such as where the sorting gates are configured to exclude 50% or more of particles of non-target particle populations, such as 55% or more, such as 60% or more, such as 65% or more, such as 70% or more, such as 75% or more, such as 80% or more, such as 85% or more, such as 90% or more, such as 95% or more, such as 97% or more, such as 99% or more and including determining a sorting gate that is configured to exclude 99.9% or more of particles of a non-target particle population cluster. In some instances, the sorting gates exclude particles of a non-target particle population cluster based on a calculated Mahalanobis distance from the ground-truth image classification parameters of each particle population cluster.

In certain embodiments, generating the sorting gates includes an FB score, where the FB score is a weighted harmonic mean of the inclusion of particles of a target particle population cluster and the exclusion of particles of a non-target particle population cluster. The beta (β) parameter of the FB score will bias the gating strategy toward either yield (e.g., increased inclusion of target particles) or purity (e.g., increased exclusion of non-target particles) of the sample. For example, where the FB score is equal to 1, the purity and yield have equal contributions to the gating strategy. Where the Fβ score is equal to 2, the gating strategy emphasizes yield over purity. Where the Fβ score is equal to 0.5, the gating strategy will emphasize purity over yield. In some embodiments, the Fβ score ranges from 0.1 to 10, such as from 0.2 to 9.5, such as from 0.3 to 9, such as from 0.4 to 8.5, such as from 0.5 to 8, such as from 0.5 to 7, such as from 0.5 to 6, such as from 0.5 to 5, such as from 0.5 to 4, such as from 0.5 to 3, such as from 0.5 to 2. In some instances, the generated sorting gates of interest have an Fβ score of 1 or more. In some instances, the generated sorting gates have an Fβ score of less than 1.

In some instances, generating a particle sorting decision according to the present disclosure includes a gating strategy of 8 sorting gates or less, such as 7 sorting gates or less, such as 6 sorting gates or less, such as 5 sorting gates or less, such as 4 sorting gates or less, such as 3 sorting gates or less and including 2 sorting gates or less. In some embodiments, methods include generating sorting gates using a graphical display (as described below) that displays one or more analysis algorithms for applying the determined ground-truth image classification parameters to the image parameters determined for the label-free particles.

In some instances, methods include assessing the sorting gates of the gating strategy and adjusting one or more of the generated sorting gates. The adjustment may be made based on a metric indicating the accuracy of the sorting gates according to the desired sorting strategy. In some instances, the metric may be an accuracy (e.g., purity) metric where the purity is compared to a predetermined threshold. The metric may be generated based on a confidence of the classifiers included in the sort strategy. In other instances, the metric may be a yield metric where the yield of target particles of a particle population cluster is compared to a predetermined threshold.

In some embodiments, methods include displaying the gating strategy on the graphical user interface. For example, the analysis algorithm may be one or more of a spectral compensation matrix, a clustering algorithm and a t-Distributed Stochastic Neighbor Embedding (t-SNE) algorithm. In some instances, the analysis algorithm is applied to the particle population cluster by dragging an icon of the analysis algorithm onto the particle population cluster. In other instances, the particle population cluster is selected and the analysis algorithm is applied by selecting from a drop-down menu. In certain instances, the analysis algorithm is a spectral unmixing algorithm, such as described in U.S. Pat. No. 11,009,400 and International Patent Application No. PCT/US2021/46741 filed on Aug. 19, 2021, the disclosures of which are herein incorporated by reference. In some instances, the gating strategy is determined using computational sorting algorithms such as described with in U.S. Pat. No. 11,513,054, the disclosure of which is herein incorporated by reference. In certain instances, the sorting gates may be determined using computer software such as HyperFinder (e.g., as described in Bonavia, et al. *Frontiers in Immunology* 2022; 13:1007016) and Computational Sorting with HyperFinder, FlowJo Software and BD FACSDiva Software (Becton Dickinson, 2021), the disclosures of which are herein incorporated by reference. In certain embodiments, the gating strategy is developed on a separate computational system (e.g., a different computer system or network) and communicated to a flow cytometer for implementing the gating strategy, such as for example using a particle sorter (e.g, having a sort decision module) of the flow cytometer.

FIG. 1 depicts a flowchart for sorting label-free particles according to certain embodiments. Light from a sample having label-free particles is measured at step 101 with a photodetector. In some instances, methods include irradiating the particles of the sample in a flow stream, such as with frequency-modulated beams of laser light. In some instances, frequency-encoded data signals are generated from the measured light. Images of the label-free particles are generated at step 102 and image parameters (e.g., radial moment, eccentricity) are calculated from the generated images at step 103. In some instances, methods include calculating a plurality of image parameters for each particle, such as 50 or more image parameters. At step 104, a gating strategy is determined for each label-free particle based on image parameters calculated for each particle and ground-truth image classification parameters. In some embodiments, methods include determining the ground-truth image classification parameters for generating the gating strategy. To determine the ground-truth image classification parameters, particles of the sample are contacted with one or more fluorophores at step 110. The fluorescently-labelled particles are irradiated and fluorescence from the irradiated particles is measured at step 111. The fluorescently-labelled particles are identified (step 112) based on the measured fluorescence (e.g., by identifying biomarkers). In some instances, one or more images of the fluorescently-labelled particles is generated from the measured fluorescence. At step 113, image parameters of the identified particles is determined and ground-truth image classification parameters are calculated from the determined image parameters (step 114). In some instances, one or more of: 1) images of the fluorescently-labelled particles; 2) image parameters generated from the identified fluorescently-labelled particles; and 3) ground-truth image classification parameters are used as training data in a machine learning algorithm. In some embodiments, the machine learning algorithm is used to classify label-free particles of the sample based on the calculated image parameters of the label-free particles and the ground-truth image classification parameters. A gating strategy having 1 or more applied gates (e.g., from 4 to 8 applied gates) is developed and a sorting decision at step 105 can be generated using the gating strategy. In some instances, label-free particles are sorted into different containers (step 106), such as with a droplet sorter (e.g., having a droplet charging device, a piezoelectric transducer for generating distinct droplets with a label-free particle and deflection plates for deflecting the droplets into different sample containers.

In certain embodiments, methods include sorting one or more of the label-free particles (e.g., cells) of the sample that are identified based on the estimated abundance of the fluorophores associated with the particle. The term "sorting" is used herein in its conventional sense to refer to separating components (e.g., droplets containing cells, droplets containing non-cellular particles such as biological macromolecules) of a sample and in some instances, delivering the separated components to one or more sample collection containers. For example, methods may include sorting 2 or more components of the sample, such as 3 or more components, such as 4 or more components, such as 5 or more components, such as 10 or more components, such as 15 or more components and including sorting 25 or more components of the sample.

In sorting particles identified based on the abundance of fluorophores associated with the particle, methods include data acquisition, analysis and recording, such as with a computer, where multiple data channels record data from each detector used in obtaining the overlapping spectra of the plurality of fluorophores associated with the particle. In these embodiments, analysis includes spectrally resolving light (e.g., by calculating the spectral unmixing matrix) from the plurality of fluorophores having overlapping spectra that are associated with the particle and identifying the particle based on the estimated abundance of each fluorophore associated with the particle. This analysis may be conveyed to a sorting system which is configured to generate a set of digitized parameters based on the particle classification.

In some embodiments, methods for sorting components of sample include sorting particles (e.g., cells in a biological sample) with a particle sorting module having deflector plates, such as described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Patent Publication No. 2020/0256781, the disclosure of which is incorporated herein by reference. In some embodiments, the subject systems include a particle sorting module having deflector plates, such as described in U.S. Patent Publication No. 2017/0299493, filed on Mar. 28, 2017, the disclosure of which is incorporated herein by reference.

Systems for Sorting Label-Free Particles of a Sample

As summarized above, aspects of the present disclosure include a system for sorting label-free particles of a sample. As described above, systems are configured to sort particles without any type of labelling, such as with fluorophores. As such, systems are configured to generate a sorting strategy and to sort particles of a sample that are not bonded or coupled to detection markers such as fluorophores, radioisotopes or contrast agents. In some embodiments, systems are configured to generate a sorting strategy for label-free particles of a sample based on image parameters determined from one or more images of the particles. In some instances, the system is configured to determine the image parameters only from images of the particles and not from another data source such as data signal waveforms. In other instances, the system is configured to generate the image parameters based on a combination of a generated image of the particles and data signal waveforms generated in response to measured light.

Systems according to certain embodiments include a light source configured to irradiate label-free particles of a sample. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm. In certain embodiments, the light source is a laser. In some instances, the subject systems include a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:$YVO_4$ laser, Nd:$yCa_4O(BO_3)_3$ laser, Nd:YCOB laser, titanium sapphire laser, thulim YAG laser, ytterbium YAG laser, ytterbium$_2O_3$ laser or cerium doped lasers and combinations thereof.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances, the non-laser light source is a stabilized fiber-coupled broadband light source, white light source, among other light sources or any combination thereof.

The light source may be positioned any suitable distance from the sample (e.g., the flow stream in a flow cytometer), such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source irradiate the sample at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle.

The light source may be configured to irradiate the sample continuously or in discrete intervals. In some instances, systems include a light source that is configured to irradiate the sample continuously, such as with a continuous wave laser that continuously irradiates the flow stream at the interrogation point in a flow cytometer. In other instances, systems of interest include a light source that is configured to irradiate the sample at discrete intervals, such as every 0.001 milliseconds, every 0.01 milliseconds, every 0.1 milliseconds, every 1 millisecond, every 10 milliseconds, every 100 milliseconds and including every 1000 milliseconds, or some other interval. Where the light source is configured to irradiate the sample at discrete intervals, systems may include one or more additional components to provide for intermittent irradiation of the sample with the light source. For example, the subject systems in these embodiments may include one or more laser beam choppers, manually or computer controlled beam stops for blocking and exposing the sample to the light source.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:$YVO_4$ laser, Nd:$yCa_4O(BO_3)_3$ laser, Nd:YCOB laser, titanium sapphire laser, thulim YAG laser, ytterbium YAG laser, ytterbium$_2O_3$ laser or cerium doped lasers and combinations thereof; a semiconductor diode laser, optically pumped semiconductor laser (OPSL), or a frequency doubled- or frequency tripled implementation of any of the above mentioned lasers.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:$YVO_4$ laser, Nd:$yCa_4O(BO_3)_3$ laser, Nd:YCOB laser, titanium sapphire laser, thulim YAG laser, ytterbium YAG laser, ytterbium2O3 laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

In certain instances, light beam generators configured to generate two or more beams of frequency shifted light include laser excitation modules as described in Diebold, et al. *Nature Photonics* Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/

0328826; 2017/0350803; 2018/0275042; 2019/0376895 and 2019/0376894 the disclosures of which are herein incorporated by reference.

In embodiments, systems include a light detection system having a plurality of photodetectors for measuring light from the label-free particles. In some instances, one or more photodetectors of the light detection system are light loss photodetectors. In some instances, one or more photodetectors of the light detection system are configured to measure scattered light. In certain instances, one or more photodetectors of the light detection system are configured to measure side-scattered light. In certain instances, one or more photodetectors of the light detection system are configured to measure forward-scattered light. In certain instances, one or more photodetectors of the light detection system are configured to measure back-scattered light. Photodetectors of interest may include, but are not limited to optical sensors, such as active-pixel sensors (APSs), avalanche photodiodes (APDs), image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In some embodiments, light detection systems of interest include a plurality of photodetectors. In some instances, the light detection system includes a plurality of solid-state detectors such as photodiodes. In certain instances, the light detection system includes a photodetector array, such as an array of photodiodes. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm and a length that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm, where the surface area of each photodetector (e.g., photodiode) in the array ranges from 25 to $\mu m^2$ to 10000 $\mu m^2$, such as from 50 to $\mu m^2$ to 9000 $\mu m^2$, such as from 75 to $\mu m^2$ to 8000 $\mu m^2$, such as from 100 to $\mu m^2$ to 7000 $\mu m^2$, such as from 150 to $\mu m^2$ to 6000 $\mu m^2$ and including from 200 to $\mu m^2$ to 5000 $\mu m^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 $mm^2$ to 10000 $mm^2$, such as from 0.5 $mm^2$ to 5000 $mm^2$, such as from 1 $mm^2$ to 1000 $mm^2$, such as from 5 $mm^2$ to 500 $mm^2$, and including from 10 $mm^2$ to 100 $mm^2$.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, photodetectors are configured to measure collected light over a range of wavelengths (e.g., 200 nm-1000 nm). In certain embodiments, photodetectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from the sample in the flow stream at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof.

The light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In embodiments, systems are configured to generate one or more images of the particles in the sample. In some embodiments, systems include memory having instructions stored thereon for generating the image from detected light absorption, detected light scatter, detected light emission or any combination thereof. In some instances, the memory includes instructions for generating the image from light absorption detected from the sample, such as from a brightfield light detector. In some instances, the memory includes instructions for generating the image from light scatter detected from the sample, such as from a side scatter detector, a forward scatter detector or a combination of a side scatter detector and forward scatter detector. In some instances, the memory includes instructions for generating the image from emitted light from the sample. In other instances, the memory includes instructions for generating the image from a combination of detected light absorption and detected light scatter.

In some embodiments, systems include memory having instructions for generating one or more images from light measured by the light detection system. In some instances, the memory includes instructions for generating a single image for each particle from each form of detected light (e.g., scattered light, light loss, etc.) In other instances, the memory includes instructions for generating a plurality of images for each particle, such as 2 or more, such as 3 or more, such as 5 or more, such as 10 or more and including 25 or more images of the particle. For example, the memory includes instructions for generating a first image of the particle from detected light absorption; instructions for generating a second image of the cell from detected light scatter and instructions for generating a third image of the cell from detected light emission. In other embodiments, two or more images are generated from each form of detected light, such as 3 or more, such as 4 or more, such as 5 or more and including 10 or more images or a combination thereof.

In some embodiments, systems include memory having instructions for generating frequency-encoded data (e.g., frequency-encoded spatial data) from the measured light from the particles in the flow stream. In some instances, the memory includes instructions for generating one or more images from the frequency-encoded data. The frequency-encoded data may be generated in one or more detection channels, such as 2 or more, such as 3 or more, such as 4 or more, such as 5 or more, such as 6 or more and including 8 or more detection channels. In some embodiments, the frequency-encoded data includes data components taken (or derived) from light from different detectors, such as detected light absorption or detected light scatter. In some instances, the memory includes instructions for phase-correcting the frequency-encoded data. In some instances, the memory includes instructions to generate phase-corrected images of the particles by performing a transform on the frequency-encoded data. In one example, the memory includes instructions to phase correct the frequency-encoded data by performing a Fourier transform (FT) of the frequency-encoded data. In another example, the memory includes instructions to phase correct the frequency-encoded data by performing a discrete Fourier transform (DFT) of the frequency-encoded data. In yet another example, the memory includes instructions to phase correct the frequency-encoded data by performing a short time Fourier transform (STFT) of the frequency-encoded data. In certain embodiments, the memory includes instructions for performing a transform of the frequency encoded data without performing any mathematical imaginary computations (i.e., only performing computations for mathematical real computations of the transform) to generate an image from the frequency-encoded data.

In some instances, the memory includes instructions to generate one or more greyscale images of the particle. The term "greyscale" is used herein in its conventional sense to refer to images of the cell in the flow stream that are composed of varying shades of gray that are based on the intensity of light at each pixel. In some embodiments, the memory includes instructions to determine a pixel intensity threshold from the greyscale image where the pixel intensity threshold value is used to convert each pixel into a binary value that is used to generate the image of the particle. In certain instances, the image of the particle is a binary pixel image of the particle such as where each pixel is assigned a binary pixel value of 1 (e.g., where the intensity of the pixel exceeds a predetermined threshold) or a binary pixel value of 0 (e.g., where the intensity of the pixel falls below a predetermined threshold).

In embodiments, systems include a memory having instructions for calculating one or more image parameters from the generated images of the particles. In some instances, the memory includes instructions for calculating a center of mass image parameter from the generated image. In some instances, the memory includes instructions for calculating a delta center of mass image parameter from the generated image. In some instances, the memory includes instructions for calculating a diffusivity image parameter from the generated image. In some instances, the memory includes instructions for calculating an eccentricity image parameter from the generated image. In some instances, the memory includes instructions for calculating a long axis moment image parameter from the generated image. In some instances, the memory includes instructions for calculating a maximum intensity image parameter from the generated image. In some instances, the memory includes instructions for calculating a radial moment image parameter from the generated image. In some instances, the memory includes instructions for calculating a short axis moment image parameter from the generated image. In some instances, the memory includes instructions for calculating a particle size image parameter from the generated image. In some instances, the memory includes instructions for calculating a total intensity image parameter from the generated image. In some instances, the memory includes instructions for calculating a particle light loss image parameter from the generated image. In some instances, the memory includes instructions for calculating a forward scattered light image parameter from the generated image. In some instances, the memory includes instructions for calculating a side scattered light image parameter from the generated image. In some instances, the memory includes instructions for calculating an image moment from the generated image. The term "image moment" is used herein in its conventional sense to refer to a weighted average of pixel intensities in an image. In some instances, the memory includes instructions for calculating the center of mass from the image moment of the image. In other instances, the memory includes instructions for calculating the orientation of the cell from the image moment of the image. In still other instances, the memory includes instructions for calculating the eccentricity of the cell from the image moment of the image.

In some embodiments, the memory includes instructions for classifying the particle based on one or more of the calculated image parameters. In some instances, the memory includes instructions for classifying the particle using a plurality of calculated image parameters, such as with a combination of 2 or more image parameters, such as 3 or more, such as 4 or more, such as 5 or more, such as 6 or more, such as 7 or more, such as 8 or more, such as 9 or more, such as 10 or more, such as 15 or more, such as 20 or more, such as 25 or more, such as 30 or more, such as 40 or more and including classifying the particle based on 50 or more image parameters that were determined from the generated image of the particle.

In some instances, the memory includes instructions for classifying the particle by comparing one or more of the calculated image parameters with ground-truth image classification parameters. In certain embodiments, the memory includes instructions for generating ground-truth classification parameters for particles of the sample. In some instances, particles from the sample (e.g., particles from a portion of the sample) are fluorescently-labelled particles (e.g., by contacting particles from the sample with fluorophores). The particles may be labelled with one or more fluorophores, such as 2 or more, such as 3 or more, such as 4 or more, such as 5 or more and including 8 or more fluorophores, such as those listed hereinabove.

In some embodiments, the memory includes instructions for irradiating the fluorescently-labelled particles with a light source (e.g., as described above) and fluorescence is measured from the irradiated particles in one or more fluorescence photodetector channels, such as 2 or more, such as 3 or more, such as 4 or more, such as 8 or more, such as 16 or more, such as 32 or more and including in 64 different fluorescence photodetector channels. In some instances, one or more of light absorption and light scatter are also measured for the fluorescently-labelled particles.

In some embodiments, the memory includes instructions for generating an image of the fluorescently-labelled particles based on the measured fluorescence from the irradiated particles. In some instances, the memory includes instructions for generating the image using light absorption from the fluorescently-labelled particles. In some instances, the memory includes instructions for generating the image using light scatter (e.g., forward-scattered light and side-scattered light) from the fluorescently-labelled particles. In some instances, the memory includes instructions for generating a plurality of images of each fluorescently-labelled particle, such as where 2 or more images are generated for each particle based on the measured fluorescence, such as 3 or more, such as 4 or more, such as 5 or more and including 10 or more images.

In some embodiments, the memory includes instructions for calculating ground-truth image classification parameters using the images generated from the fluorescently-labelled particles. In some instances, the memory includes instructions for calculating a ground-truth center of mass image classification parameter from the image generated using the fluorescently-labelled particles. In some instances, the memory includes instructions for calculating a ground-truth delta center of mass image classification parameter from the image generated using the fluorescently-labelled particles. In some instances, the memory includes instructions for calculating a ground-truth diffusivity image classification parameter from the image generated using the fluorescently-labelled particles. In some instances, the memory includes instructions for calculating a ground-truth eccentricity image classification parameter from the generated image. In some instances, the memory includes instructions for calculating a ground-truth long axis moment image classification parameter from the image generated using the fluorescently-labelled particles. In some instances, the memory includes instructions for calculating a ground-truth maximum intensity image classification parameter from the image generated using the fluorescently-labelled particles. In some instances, the memory includes instructions for calculating a ground-truth radial moment image classification parameter from the image generated using the fluorescently-labelled particles. In some instances, the memory includes instructions for calculating a ground-truth short axis moment image classification parameter from the image generated using the fluorescently-labelled particles. In some instances, the memory includes instructions for calculating a ground-truth particle size image classification parameter from the image generated using the fluorescently-labelled particles. In some instances, the memory includes instructions for calculating a ground-truth total intensity image classification parameter from the image generated using the fluorescently-labelled particles. In some instances, the memory includes instructions for calculating a ground-truth particle light loss image classification parameter from the image generated using the fluorescently-labelled particles. In some instances, the memory includes instructions for calculating a ground-truth forward scattered light image classification parameter from the image generated using the fluorescently-labelled particles. In some instances, the memory includes instructions for calculating a ground-truth side scattered light image classification parameter from the image generated using the fluorescently-labelled particles. In some instances, the memory includes instructions for calculating a ground-truth image moment classification parameter from the image generated using the fluorescently-labelled particles.

In some embodiments, the memory includes instructions for calculating one or more of the ground-truth image classification parameters by inputting images of the fluorescently-labelled particles generated from measured fluorescence from the irradiated particles into a machine learning algorithm as one or more training data sets. In some instances, the system includes a processor with memory for running a machine learning algorithm that is a dynamic algorithm that updates based on determined image parameters of the fluorescently labelled particles. The system may be configured to implement any convenient machine learning algorithm where machine learning algorithms of interest can include, but are not limited to a linear regression algorithm, a logistic regression algorithm, a Naïve Bayes algorithm, a k-nearest neighbor (kNN) algorithm, a Random forest algorithm, decision tree algorithm, a support vector machine algorithm, a gradient boosting algorithm and a clustering algorithm. In certain embodiments, systems are configured to implement a neural network. In some instances, the machine learning algorithm is a neural network such as an artificial neural network, a convolutional neural network or a recurrent neural network. In certain instances, the system is configured to implement a python script.

In some instances, training data sets inputted into the machine learning algorithm have 2 or more images of the fluorescently-labelled particles, such as 3 or more, such as 5 or more, such as 10 or more, such as 15 or more, such as 20 or more, such as 25 or more, such as 50 or more, such as 100 or more, such as 250 or more, such as 500 or more, such as 750 or more and including inputting into the machine learning algorithm training data sets having 1000 or more images of the fluorescently-labelled particles. In certain instances, the training data sets may include one or more images of particle clusters, such as a particle cluster which forms a doublet in a generated data signal.

In some embodiments, ground-truth image classification parameters calculated from images of the fluorescently-labelled particles by the machine learning algorithm are determined for one or more photodetector channels of the light detection system. In certain instances, ground-truth image classification parameters are determined for all of the photodetector channels of the light detection system. For example, ground-truth image classification parameters of may be determined for the scattered light photodetector channels (e.g., forward-scattered light, side-scattered light), the light absorption photodetector channels and the fluorescence photodetector channels.

In some embodiments, the memory includes instructions for adjusting one or more of the ground-truth image classification parameters. In some instances, the memory includes instructions for calculating an adjustment to one or more of the ground-truth image classification parameters by determining accuracy and loss statistics of the generated dynamic particle classification algorithm. In some instances, the memory includes instructions for calculating the accuracy and loss statistics of the dynamic particle classification algorithm by an iterative optimization approach. In certain instances, the iterative optimization approach is a first-order optimization algorithm. In some instances, the memory includes instructions for calculating the accuracy and loss statistics of the dynamic particle classification algorithm by a gradient descent algorithm. In certain instances, the memory includes instructions for calculating the accuracy and loss statistics of the dynamic particle classification algorithm by backpropagation. In some embodiments, the memory includes instructions for adjusting one or more of the ground-truth image classification parameters based on the calculated accuracy and loss statistics. In some instances, the memory includes instructions to iteratively adjust each one of the ground-truth image classification parameters in each photodetector channel to converge on an optimized set of image classification parameters for the dynamic particle classification algorithm.

In some embodiments, the memory includes instructions for applying the determined ground-truth image classification parameters to classify label-free particles of a sample in a flow stream. In some instances, the memory includes instructions for classifying label-free particles of the sample by assigning a label-free particle to a particle population cluster based on the comparison between the ground-truth image classification parameters of each particle population cluster and the calculated image parameters of the particle.

In some embodiments, the memory includes instructions for determining one or more sorting gates for the classified particles of the sample. In some instances, the memory includes instructions for generating one or more sorting gates that capture particles of a target particle population cluster and exclude particles of a non-target particle population cluster. In some instances, the memory includes instructions for determining the sorting gates using the ground-truth image classification parameters of each particle population cluster. In some instances, the memory includes instructions to configure the sorting gates to maximize the inclusion yield of the particles of a target particle population cluster, such as where the sorting gates are configured to generate an inclusion yield of particles of a target particle population cluster of 50% or more, such as 55% or more, such as 60% or more, such as 65% or more, such as 70% or more, such as 75% or more, such as 80% or more, such as 85% or more, such as 90% or more, such as 95% or more, such as 97% or more, such as 99% or more and including where a sorting gate is configured to generate an inclusion yield of particles of a target particle population cluster of 99.9% or more. In some instances, the memory includes instructions to configure the sorting gates to maximize the purity yield of the particles of a target particle population cluster, such as where the sorting gates are configured to generate a purity yield of particles of a target particle population cluster of 50% or more, such as 55% or more, such as 60% or more, such as 65% or more, such as 70% or more, such as 75% or more, such as 80% or more, such as 85% or more, such as 90% or more, such as 95% or more, such as 97% or more, such as 99% or more and including where a sorting gate is configured to generate a purity yield of particles of a target particle population cluster of 99.9% or more.

In some instances, the memory includes instructions to configure the sorting gates to maximize the exclusion of particles of a non-target particle population, such as where the sorting gates are configured to exclude 50% or more of particles of non-target particle populations, such as 55% or more, such as 60% or more, such as 65% or more, such as 70% or more, such as 75% or more, such as 80% or more, such as 85% or more, such as 90% or more, such as 95% or more, such as 97% or more, such as 99% or more and including where a sorting gate is configured to exclude 99.9% or more of particles of a non-target particle population cluster. In some instances, the memory includes instructions to configure the sorting gates to exclude particles of a non-target particle population cluster based on a calculated Mahalanobis distance from the ground-truth image classification parameters of each particle population cluster.

In certain embodiments, the memory includes instructions for generating the sorting gates by implementing an Fβ score, where the Fβ score is a weighted harmonic mean of the inclusion of particles of a target particle population cluster and the exclusion of particles of a non-target particle population cluster. The beta (β) parameter of the Fβ score will bias the gating strategy toward either yield (e.g., increased inclusion of target particles) or purity (e.g., increased exclusion of non-target particles) of the sample. For example, where the Fβ score is equal to 1, the purity and yield have equal contributions to the gating strategy. Where the Fβ score is equal to 2, the gating strategy emphasizes yield over purity. Where the Fβ score is equal to 0.5, the gating strategy will emphasize purity over yield. In some embodiments, the Fβ score ranges from 0.1 to 10, such as from 0.2 to 9.5, such as from 0.3 to 9, such as from 0.4 to 8.5, such as from 0.5 to 8, such as from 0.5 to 7, such as from 0.5 to 6, such as from 0.5 to 5, such as from 0.5 to 4, such as from 0.5 to 3, such as from 0.5 to 2. In some instances, the generated sorting gates of interest have an Fβ score of 1 or more. In some instances, the generated sorting gates have an Fβ score of less than 1.

In some instances, the memory includes instructions for generating a particle sorting decision which includes a gating strategy of 8 sorting gates or less, such as 7 sorting gates or less, such as 6 sorting gates or less, such as 5 sorting gates or less, such as 4 sorting gates or less, such as 3 sorting gates or less and including 2 sorting gates or less. In some embodiments, the memory includes instructions for generating sorting gates using a graphical display that displays one or more analysis algorithms for applying the determined ground-truth image classification parameters to the image parameters determined for the label-free particles. In some embodiments, systems include a display for visualizing the gating strategy on a graphical user interface.

In some instances, the graphical user interface applies an analysis algorithm for generating the gating strategy. For example, the analysis algorithm may be one or more of a spectral compensation matrix, a clustering algorithm and a t-Distributed Stochastic Neighbor Embedding (t-SNE) algorithm. In some instances, the analysis algorithm is applied to the particle population cluster by dragging an icon of the analysis algorithm onto the particle population cluster. In other instances, the particle population cluster is selected and the analysis algorithm is applied by selecting from a drop-down menu. In certain instances, the analysis algorithm is a spectral unmixing algorithm, such as described in U.S. Pat. No. 11,009,400 and International Patent Application No. PCT/US2021/46741 filed on Aug. 19, 2021, the disclosures of which are herein incorporated by reference.

In some instances, systems include memory having instructions for determining the gating strategy using computational sorting algorithms such as described with in U.S. Pat. No. 11,513,054, the disclosure of which is herein incorporated by reference. In certain instances, the system includes memory having computer software for determining the sorting gate such as HyperFinder (e.g., as described in Bonavia, et al. Frontiers in Immunology 2022; 13:1007016) and Computational Sorting with HyperFinder, FlowJo Software and BD FACSDiva Software (Becton Dickinson, 2021), the disclosures of which are herein incorporated by reference. In certain embodiments, the gating strategy is developed on a separate computational system (e.g., a different computer system or network) and communicated to a flow cytometer for implementing the gating strategy, such as for example using a particle sorter (e.g, having a sort decision module) of the flow cytometer.

In some embodiments, systems for generating the gating strategy are part of or operationally coupled to a particle analyzer system (e.g., a flow cytometer) for generating flow cytometer data described herein.

In some instances, systems include an integrated circuit device programmed to implement one or more of the methods described above. In some instances, the integrated circuit includes programming for generating an image of the particle (e.g., label-free particle or fluorescently-labelled particle). In some instances, the integrated circuit includes programming for calculating an image parameter from the generated image of the particle. In some instances, the integrated circuit includes programming for calculating one or more ground-truth image classification parameters. In some instances, the integrated circuit includes programming for classifying label-free particles based on the calculated image parameters and the ground-truth image classification parameters. In some embodiments, integrated circuit devices of interest include a field programmable gate array (FPGA). In other embodiments, integrated circuit devices include an application specific integrated circuit (ASIC). In yet other embodiments, integrated circuit devices include a complex programmable logic device (CPLD).

Systems according to some embodiments, may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low-level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, the processor includes analog electronics which provide feedback control, such as for example negative feedback control.

The system memory may be any of a variety of known or future memory storage devices. Examples include any commonly available random-access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

In certain embodiments, the subject systems include one or more optical adjustment components for adjusting the light such as light irradiated onto the sample (e.g., from a laser) or light collected from the sample (e.g., scattered, fluorescence). For example, the optical adjustment may be to increase the dimensions of the light, the focus of the light or to collimate the light. In some instances, optical adjustment is a magnification protocol so as to increase the dimensions of the light (e.g., beam spot), such as increasing the dimensions by 5% or more, such as by 10% or more, such as by 25% or more, such as by 50% or more and including increasing the dimensions by 75% or more. In other embodiments, optical adjustment includes focusing the light so as to reduce the light dimensions, such as by 5% or greater, such as by 10% or greater, such as by 25% or greater, such as by 50% or greater and including reducing the dimensions of the beam spot by 75% or greater. In certain embodiments, optical adjustment includes collimating the light. The term "collimate" is used in its conventional sense to refer to the optically adjusting the collinearity of light propagation or reducing divergence by the light of from a common axis of propagation. In some instances, collimating includes narrowing the spatial cross section of a light beam (e.g., reducing the beam profile of a laser)

In some embodiments, the optical adjustment component is a focusing lens having a magnification ratio of from 0.1 to 0.95, such as a magnification ratio of from 0.2 to 0.9, such as a magnification ratio of from 0.3 to 0.85, such as a magnification ratio of from 0.35 to 0.8, such as a magnification ratio of from 0.5 to 0.75 and including a magnification ratio of from 0.55 to 0.7, for example a magnification ratio of 0.6. For example, the focusing lens is, in certain instances, a double achromatic de-magnifying lens having a magnification ratio of about 0.6. The focal length of the focusing lens may vary, ranging from 5 mm to 20 mm, such as from 6 mm to 19 mm, such as from 7 mm to 18 mm, such as from 8 mm to 17 mm, such as from 9 mm to 16 and including a focal length ranging from 10 mm to 15 mm. In certain embodiments, the focusing lens has a focal length of about 13 mm.

In other embodiments, the optical adjustment component is a collimator. The collimator may be any convenient collimating protocol, such as one or more mirrors or curved lenses or a combination thereof. For example, the collimator is in certain instances a single collimating lens. In other instances, the collimator is a collimating mirror. In yet other instances, the collimator includes two lenses. In still other instances, the collimator includes a mirror and a lens. Where the collimator includes one or more lenses, the focal length of the collimating lens may vary, ranging from 5 mm to 40 mm, such as from 6 mm to 37.5 mm, such as from 7 mm to 35 mm, such as from 8 mm to 32.5 mm, such as from 9 mm to 30 mm, such as from 10 mm to 27.5 mm, such as from 12.5 mm to 25 mm and including a focal length ranging from 15 mm to 20 mm.

In some embodiments, the subject systems include a flow cell nozzle having a nozzle orifice configured to flow a flow stream through the flow cell nozzle. The subject flow cell nozzle has an orifice which propagates a fluidic sample to a sample interrogation region, where in some embodiments, the flow cell nozzle includes a proximal cylindrical portion defining a longitudinal axis and a distal frustoconical portion which terminates in a flat surface having the nozzle orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the nozzle chamber does not include a cylindrical portion and the entire flow cell nozzle chamber is frustoconically shaped. In these embodiments, the length of the frustoconical nozzle chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical nozzle chamber may range from 1 mm to 10 mm, such as from 2 mm to 9 mm, such as from 3 mm to 8 mm and including from 4 mm to 7 mm.

In embodiments, the sample flow stream emanates from an orifice at the distal end of the flow cell nozzle. Depending on the desired characteristics of the flow stream, the flow cell nozzle orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell nozzle of interest has a circular orifice. The size of the nozzle orifice may vary, in some embodiments ranging from 1 μm to 20000 μm, such as from 2 μm to 17500 μm, such as from 5 μm to 15000 μm, such as from 10 μm to 12500 μm, such as from 15 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell nozzle includes a sample injection port configured to provide a sample to the flow cell nozzle. In embodiments, the sample injection system is configured to provide suitable flow of sample to the flow cell nozzle chamber. Depending on the desired characteristics of the flow stream, the rate of sample conveyed to the flow cell nozzle chamber by the sample injection port may be 1 μL/sec or more, such as 2 μL/sec or more, such as 3 μL/sec or more, such as 5 L/sec or more, such as 10 μL/sec or more, such as 15 μL/sec or more, such as 25 μL/sec or more, such as 50 μL/sec or more, such as 100 μL/sec or more, such as 150 μL/sec or more, such as 200 μL/sec or more, such as 250 μL/sec or more, such as 300 μL/sec or more, such as 350 μL/sec or more, such as 400 μL/sec or more, such as 450 μL/sec or more and including 500 μL/sec or more. For example, the sample flow rate may range from 1 μL/sec to about 500 μL/sec, such as from 2 μL/sec to about 450 μL/sec, such as from 3 μL/sec to about 400 μL/sec, such as from 4 μL/sec to about 350 μL/sec, such as from 5 μL/sec to about 300 μL/sec, such as from 6 μL/sec to about 250 μL/sec, such as from 7 μL/sec to about 200 μL/sec, such as from 8 μL/sec to about 150 μL/sec, such as from 9 μL/sec to about 125 μL/sec and including from 10 μL/sec to about 100 μL/sec.

The sample injection port may be an orifice positioned in a wall of the nozzle chamber or may be a conduit positioned at the proximal end of the nozzle chamber. Where the sample injection port is an orifice positioned in a wall of the nozzle chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell nozzle chamber. For example, the sample injection port may be a conduit positioned to have the orifice of the sample injection port in line with the flow cell nozzle orifice. Where the sample injection port is a conduit positioned in line with the flow cell nozzle orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell nozzle also includes a sheath fluid injection port configured to provide a sheath fluid to the flow cell nozzle. In embodiments, the sheath fluid injection system is configured to provide a flow of sheath fluid to the flow cell nozzle chamber, for example in conjunction with the sample to produce a laminated flow stream of sheath fluid surrounding the sample flow stream. Depending on the desired characteristics of the flow stream, the rate of sheath fluid conveyed to the flow cell nozzle chamber by the may be 25 μL/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more. For example, the sheath fluid flow rate may range from 1 μL/sec to about 500 μL/sec, such as from 2 μL/sec to about 450 μL/sec, such as from 3 μL/sec to about 400 μL/sec, such as from 4 μL/sec to about 350 μL/sec, such as from 5 μL/sec to about 300 μL/sec, such as from 6 μL/sec to about 250 μL/sec, such as from 7 μL/sec to about 200 μL/sec, such as from 8 μL/sec to about 150 μL/sec, such as from 9 μL/sec to about 125 μL/sec and including from 10 μL/sec to about 100 μL/sec.

In some embodiments, the sheath fluid injection port is an orifice positioned in a wall of the nozzle chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

The subject systems, in certain instances, include a sample interrogation region in fluid communication with the flow cell nozzle orifice. In these instances, a sample flow stream emanates from an orifice at the distal end of the flow cell nozzle and particles in the flow stream may be irradiated with a light source at the sample interrogation region. The size of the interrogation region may vary depending on the properties of the flow nozzle, such as the size of the nozzle orifice and sample injection port size. In embodiments, the interrogation region may have a width that is 0.01 mm or more, such as 0.05 mm or more, such as 0.1 mm or more, such as 0.5 mm or more, such as 1 mm or more, such as 2 mm or more, such as 3 mm or more, such as 5 mm or more and including 10 mm or more. The length of the interrogation region may also vary, ranging in some instances along 0.01 mm or more, such as 0.1 mm or more, such as 0.5 mm or more, such as 1 mm or more, such as 1.5 mm or more, such as 2 mm or more, such as 3 mm or more, such as 5 mm or more, such as 10 or more, such as 15 mm or more, such as 20 mm or more, such as 25 mm or more and including 50 mm or more.

The interrogation region may be configured to facilitate irradiation of a planar cross-section of an emanating flow stream or may be configured to facilitate irradiation of a diffuse field (e.g., with a diffuse laser or lamp) of a predetermined length. In some embodiments, the interrogation region includes a transparent window that facilitates irradiation of a predetermined length of an emanating flow stream, such as 1 mm or more, such as 2 mm or more, such as 3 mm or more, such as 4 mm or more, such as 5 mm or more and including 10 mm or more. Depending on the light source used to irradiate the emanating flow stream (as described below), the interrogation region may be configured to pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm. As such, the interrogation region may be formed from any transparent material which passes the desired range of wavelength, including but not limited to optical glass, borosilicate glass, Pyrex glass, ultraviolet quartz, infrared quartz, sapphire as well as plastic, such as polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials, including polyester, where polyesters of interest may include, but are not limited to poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly(hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly(ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediyl alkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly(tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); polyesters, e.g., polyethylene terephthalates, e.g., Mylar™ polyethylene terephthalate; etc. In some embodiments, the subject systems include a cuvette positioned in the sample interrogation region. In embodiments, the cuvette may pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm.

In certain embodiments, light detection systems having the plurality of photodetectors as described above are part of or positioned in a particle analyzer, such as a particle sorter. In certain embodiments, the subject systems are flow cytometric systems that includes the photodiode and amplifier component as part of a light detection system for detecting light emitted by a sample in a flow stream. Suitable flow cytometry systems may include, but are not limited to, those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5):502-11; Alison, et al. *J Pathol*, 2010 December; 222(4):335-344; and Herbig, et al. (2007) *Crit Rev Ther Drug Carrier Syst*. 24(3): 203-255; the disclosures of which are incorporated herein by reference. In certain instances, flow cytometry systems of interest include BD Biosciences FACSCanto™ flow cytometer, BD Biosciences FACSCanto™ || flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In some embodiments, systems include a particle sorter component. The term "sorting" is used herein in its conventional sense to refer to separating components (e.g., cells, non-cellular particles such as biological macromolecules) of the sample and in some instances delivering the separated components to one or more sample collection containers. For example, the subject systems may be configured for sorting samples having 2 or more components, such as 3 or more components, such as 4 or more components, such as 5 or more components, such as 10 or more components, such as 15 or more components and including soring a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container.

In some embodiments, particle sorting systems of interest are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Patent Publication No. 2020/0256781, the disclosure of which is incorporated herein by reference. In some embodiments, the subject systems include a particle sorting module having deflector plates, such as described in U.S. Patent Publication No. 2017/0299493, filed on Mar. 28, 2017, the disclosure of which is incorporated herein by reference.

Figure 3A:
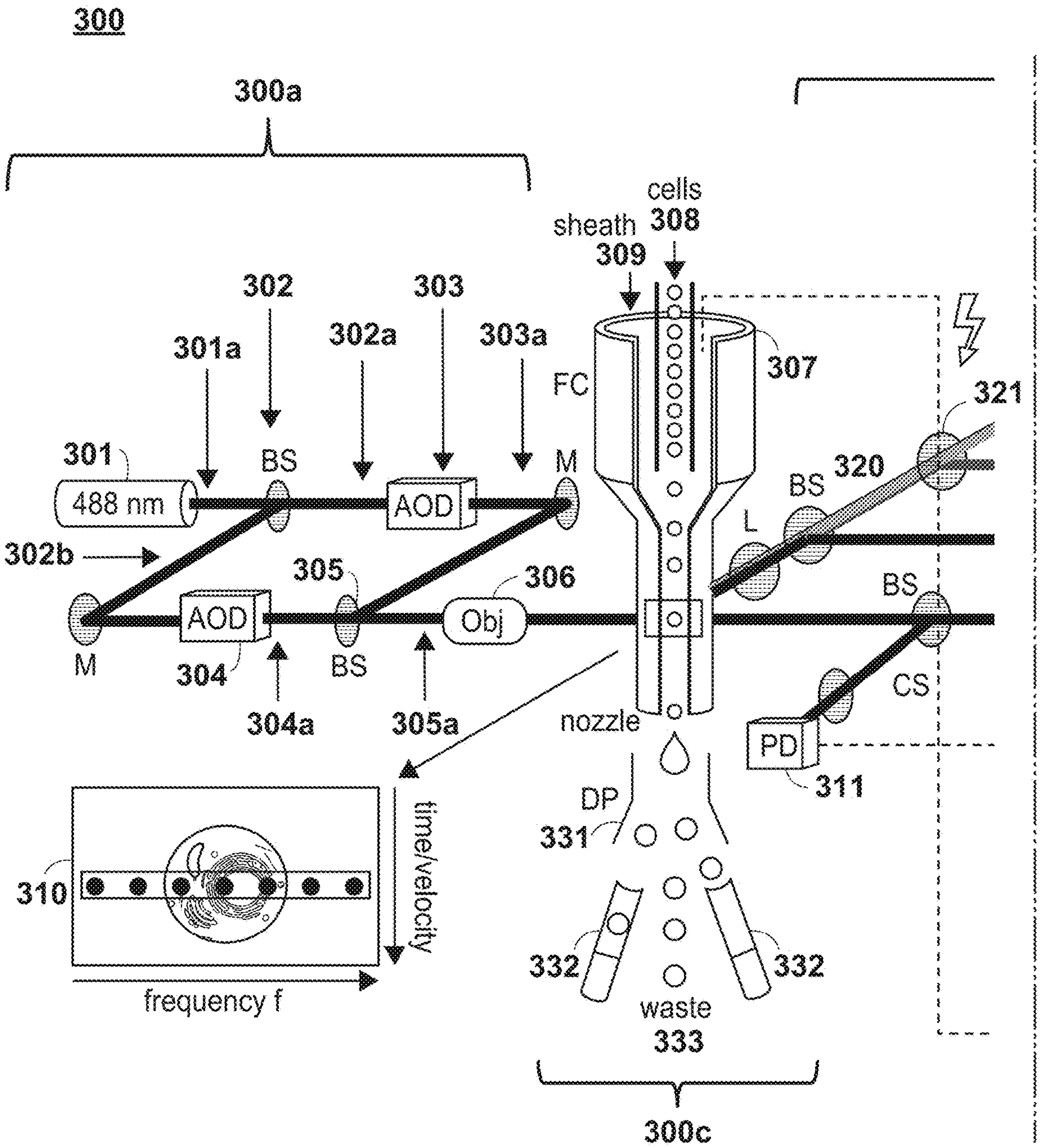
FIG. 3A depicts an image-enabled particle sorter according to certain embodiments.
Figure 3A:
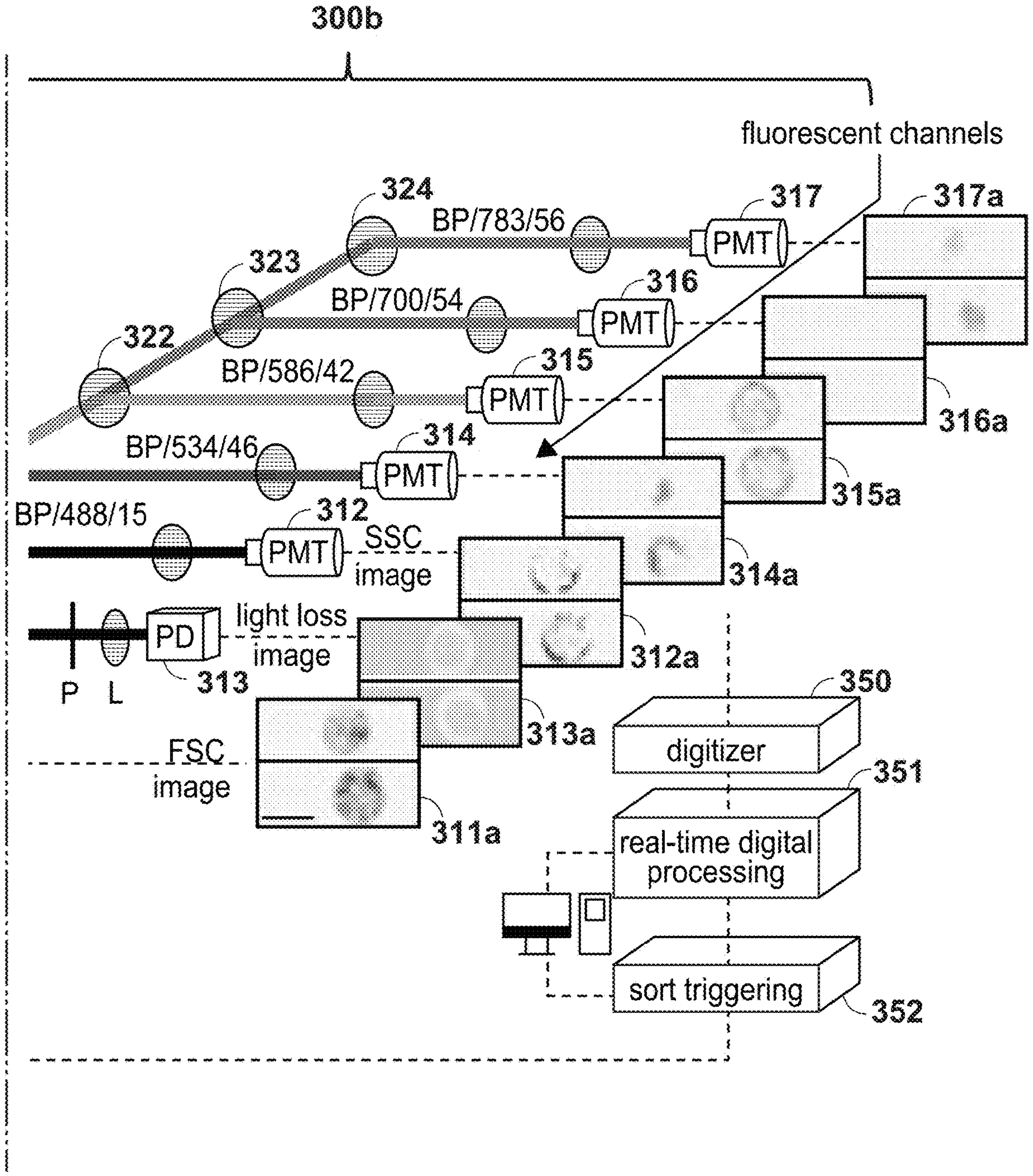

In certain embodiments, systems are an image-enabled particle sorter using frequency-encoded data, such as depicted in FIG. 3A. Particle sorter 300 includes a light irradiation component **300*a* which includes light source 301 (e.g., 488 nm laser) which generates output beam of light 301*a* that is split with beamsplitter 302 into beams 302*a* and 302*b*. Light beam 302*a* is propagated through acousto-optic device (e.g., an acousto-optic deflector, AOD) 303 to generate an output beam 303*a* having one or more angularly deflected beams of light. In some instances, output beam 303*a* generated from acousto-optic device 303 includes a local oscillator beam and a plurality of radiofrequency comb beams. Light beam 302*b* is propagated through acousto-optic device (e.g., an acousto-optic deflector, AOD) 304 to generate an output beam 304*a* having one or more angularly deflected beams of light. In some instances, output beam 304*a* generated from acousto-optic device 304 includes a local oscillator beam and a plurality of radiofrequency comb beams. Output beams 303*a* and 304*a* generated from acousto-optic devices 303 and 304, respectively are combined with beamsplitter 305 to generate output beam 305*a* which is conveyed through an optical component 306 (e.g., an objective lens) to irradiate particles in flow cell 307. In certain embodiments, acousto-optic device 303 (AOD) splits a single laser beam into an array of beamlets, each having different optical frequency and angle. Second AOD 304 tunes the optical frequency of a reference beam, which is then overlapped with the array of beamlets at beam combiner 305**. In certain embodiments, the light irradiation system having a light source and acousto-optic device can also include those described in Schraivogel, et al. ("*High-speed fluorescence image-enabled cell sorting*" *Science* (2022), 375 (6578): 315-320) and United States Patent Publication No. 2021/0404943, the disclosure of which is herein incorporated by reference.

Output beam **305*a* irradiates sample particles 308 propagating through flow cell 307 (e.g., with sheath fluid 309) at irradiation region 310. As shown in irradiation region 310, a plurality of beams (e.g., angularly deflected radiofrequency shifted beams of light depicted as dots across irradiation region 310) overlaps with a reference local oscillator beam (depicted as the shaded line across irradiation region 310**). Due to their differing optical frequencies, the overlapping beams exhibit a beating behavior, which causes each beamlet to carry a sinusoidal modulation at a distinct frequency $f_{1-n}$.

Light from the irradiated sample is conveyed to light detection system **300*b* that includes a plurality of photodetectors. Light detection system 300***b* includes forward scattered light photodetector 311 for generating forward scatter images 311*a* and a side scattered light photodetector 312 for generating side scatter images 312*a*. Light detection system 300*b* also includes brightfield photodetector 313 for generating light loss images 313*a*. In some embodiments, forward scatter detector 311 and side scatter detector 312 are photodiodes (e.g., avalanche photodiodes, APDs). In some instances, brightfield photodetector 313 is a photomultiplier tube (PMT). Fluorescence from the irradiated sample is also detected with fluorescence photodetectors 314-317. In some instances, photodetectors 314-317 are photomultiplier tubes. Light from the irradiated sample is directed to the side scatter detection channel 312 and fluorescence detection channels 314-317 through beamsplitter 320. Light detection system 300*b* includes bandpass optical components 321, 322, 323 and 324 (e.g., dichroic mirrors) for propagating predetermined wavelength of light to photodetectors 314-317. In some instances, optical component 321 is a 534 nm/40 nm bandpass. In some instances, optical component 322 is a 586 nm/42 nm bandpass. In some instances, optical component 323 is a 700 nm/54 nm bandpass. In some instances, optical component 324 is a 783 nm/56 nm bandpass. The first number represents the center of a spectral band. The second number provides a range of the spectral band. Thus, a 510/20 filter extends 10 nm on each side of the center of the spectral band, or from 500 nm to 520 nm.

Data signals generated in response to light detected in scattered light detection channels 311 and 312, brightfield light detection channel 313 and fluorescence detection channels 314-317 are processed by real-time digital processing with processors 350 and 351. Images 311*a*-317*a* can be generated in each light detection channel based on the data signals generated in processors 350 and 351. Image-enabled sorting is performed in response to a sort signal generated in sort trigger 352. Sorting component 300*c* includes deflection plates 331 for deflecting particles into sample containers 332 or to waste stream 333. In some instances, sort component 300*c* is configured to sort particles with an enclosed particle sorting module, such as those described in U.S. Patent Publication No. 2017/0299493, filed on Mar. 28, 2017, the disclosure of which is incorporated herein by reference. In certain embodiments, sorting component 300*c* includes a sort decision module having a plurality of sort decision units, such as those described in U.S. Patent Publication No. 2020/0256781, the disclosure of which is incorporated herein by reference.

Figure 3B:
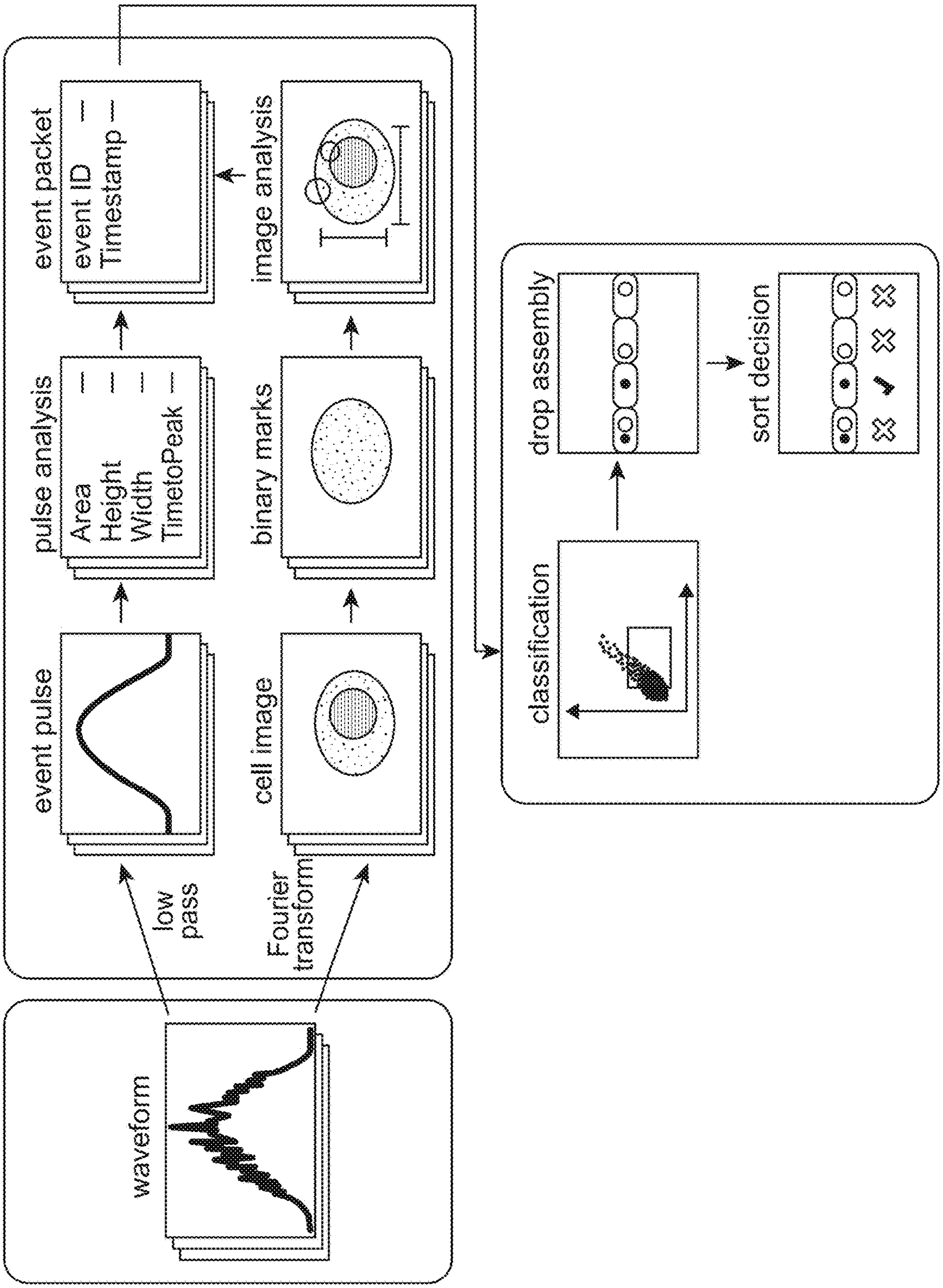
FIG. 3B depicts image-enabled particle sorting data processing according to certain embodiments.

FIG. 3B depicts image-enabled particle sorting data processing according to certain embodiments. In some instances, image-enabled particle sorting data processing is a low-latency data processing pipeline. Each photodetector produces a pulse with high-frequency modulations encoding the image (waveform). Fourier analysis is performed to reconstruct the image from the modulated pulse. An image processing pipeline produces a set of image features (image analysis), which are combined with features derived from a pulse processing pipeline (event packet). Real-time sort classification electronics then classify the particle based on image features, producing a sort decision that is used to selectively charge the droplets.

Figure 4A:
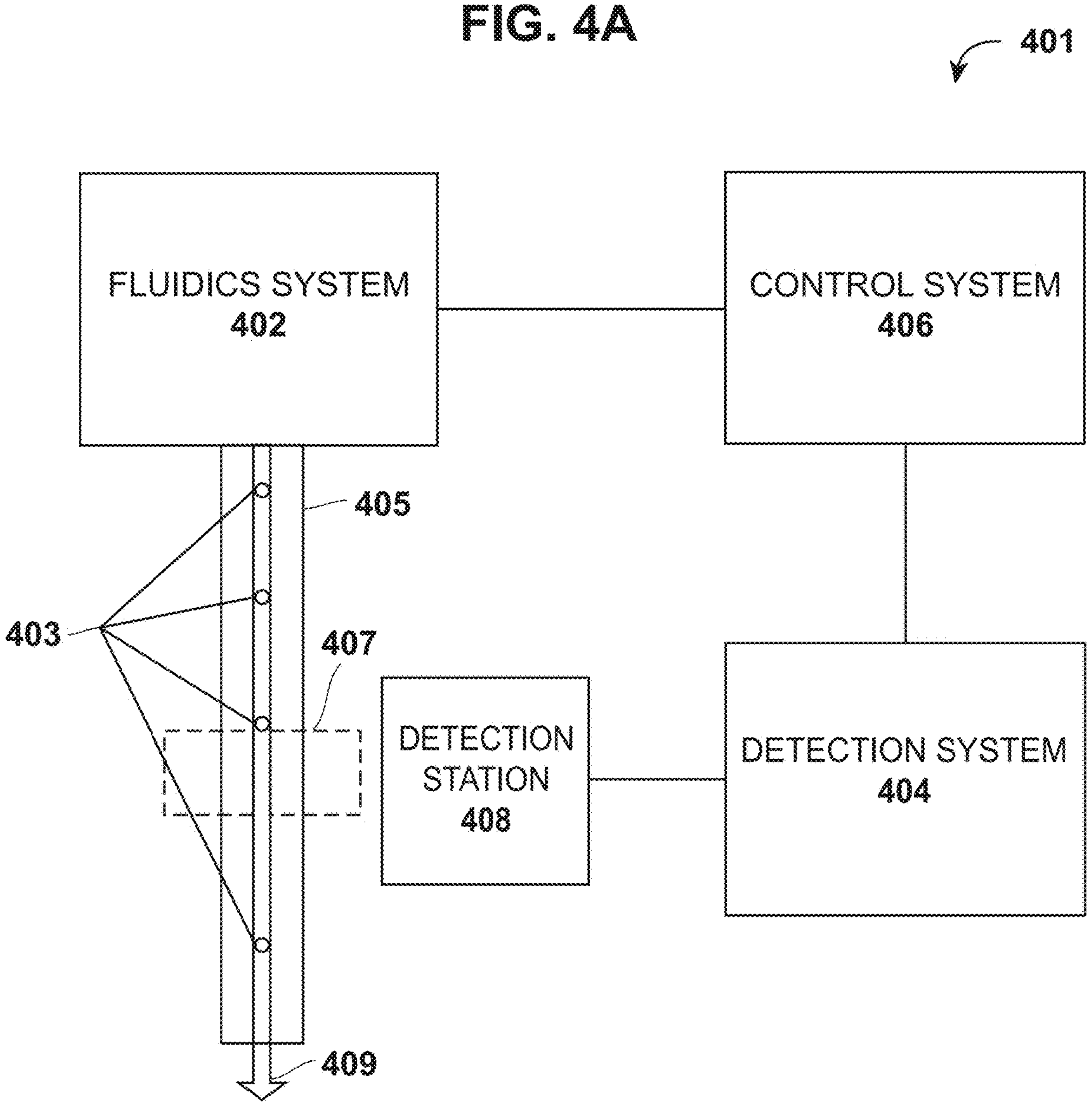
FIG. 4A depicts a functional block diagram of a particle analysis system according to certain embodiments.

In some embodiments, systems are particle analyzers where the particle analysis system 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first-time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first-time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
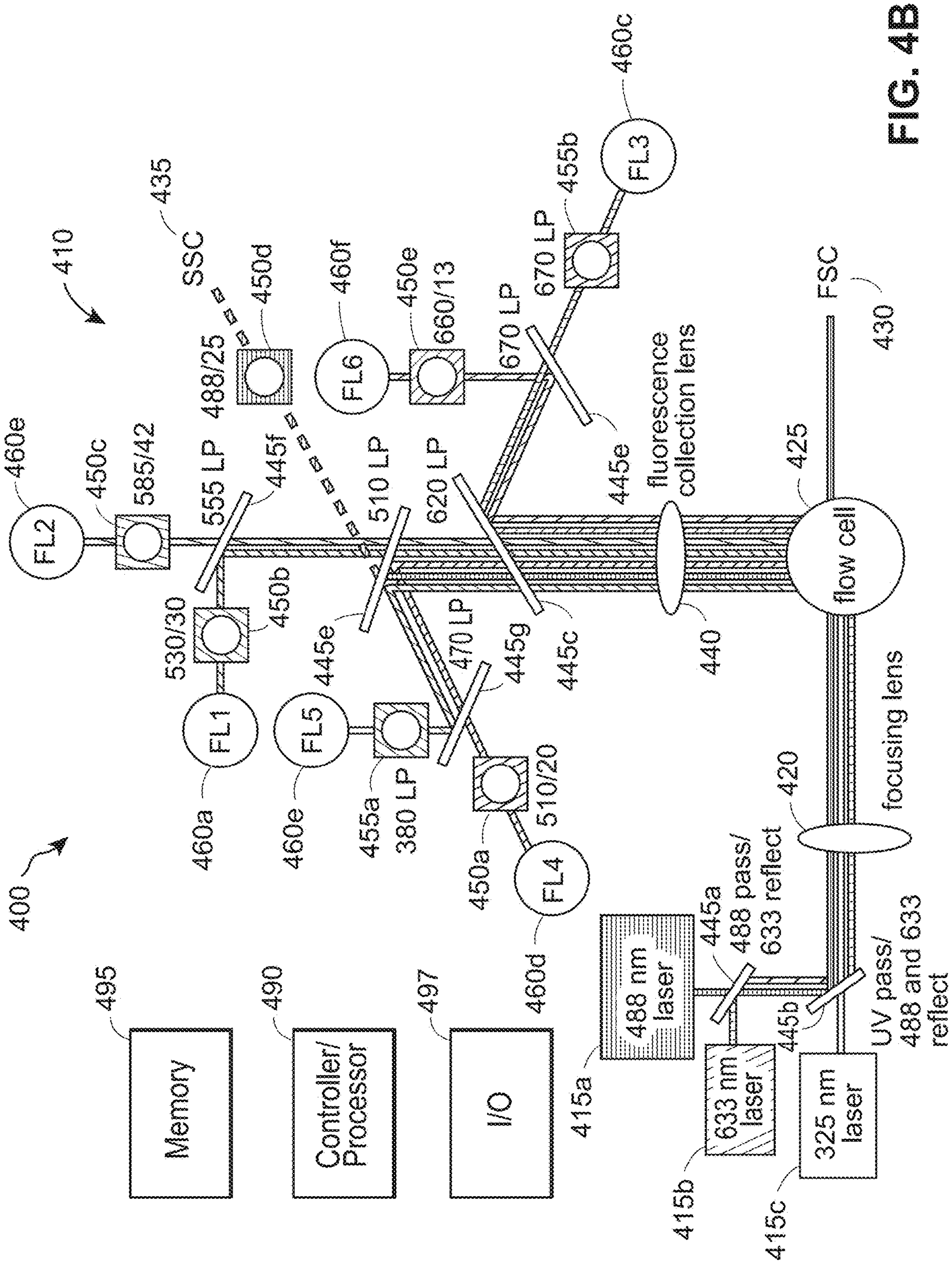
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415*a*-415*c*, a focusing lens 420, a flow chamber 425, a forward scatter detector 430, a side scatter detector 435, a fluorescence collection lens 440, one or more beam splitters 445*a*-445*g*, one or more bandpass filters 450*a*-450*e*, one or more longpass ("LP") filters 455*a*-455*b*, and one or more fluorescent detectors 460*a*-460*f*.

The excitation lasers 115*a-c* emit light in the form of a laser beam. The wavelengths of the laser beams emitted from excitation lasers 415*a*-415*c* are 488 nm, 633 nm, and 325 nm, respectively, in the example system of FIG. 4B. The laser beams are first directed through one or more of beam splitters 445*a* and 445*b*. Beam splitter 445*a* transmits light at 488 nm and reflects light at 633 nm. Beam splitter 445*b* transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460*a*-460*f* through one or more of the beam splitters 445*a*-445*g*, the bandpass filters 450*a*-450*e*, the longpass filters 455*a*-455*b*, and the fluorescence collection lens 440.

The fluorescence collection lens 440 collects light emitted from the particle-laser beam interaction and routes that light towards one or more beam splitters and filters. Bandpass filters, such as bandpass filters 450*a*-450*e*, allow a narrow range of wavelengths to pass through the filter. For example, bandpass filter 450*a* is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455*a*-455*b*, transmit wavelengths of light equal to or longer than a specified wavelength of light. For example, longpass filter 455*a*, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445*g* is a 620 SP beam splitter, meaning that the beam splitter 445*g* transmits wavelengths of light that are 620 nm or shorter and reflects wavelengths of light that are longer than 620 nm in a different direction. In one embodiment, the beam splitters 445*a*-445*g* can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460*a*-460*f*. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a “filter window” for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
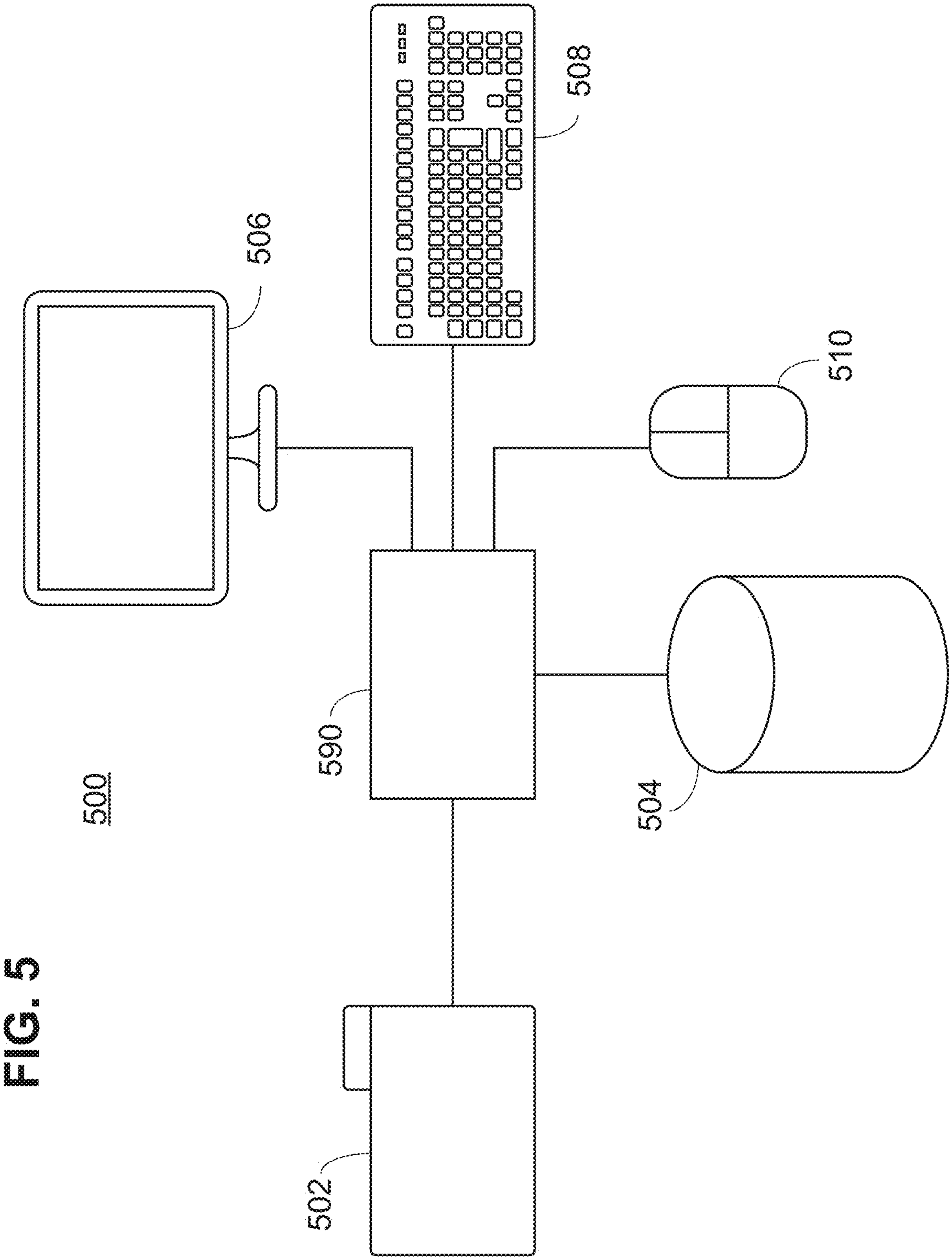
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer or sorting system 502 can be configured to acquire biological event data. For example, a flow cytometer can generate flow cytometric event data. The particle analyzer 502 can be configured to provide biological event data to the analytics controller 500. A data communication channel can be included between the particle analyzer or sorting system 502 and the analytics controller 500. The biological event data can be provided to the analytics controller 500 via the data communication channel.

The analytics controller 500 can be configured to receive biological event data from the particle analyzer or sorting system 502. The biological event data received from the particle analyzer or sorting system 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Figure 6A:
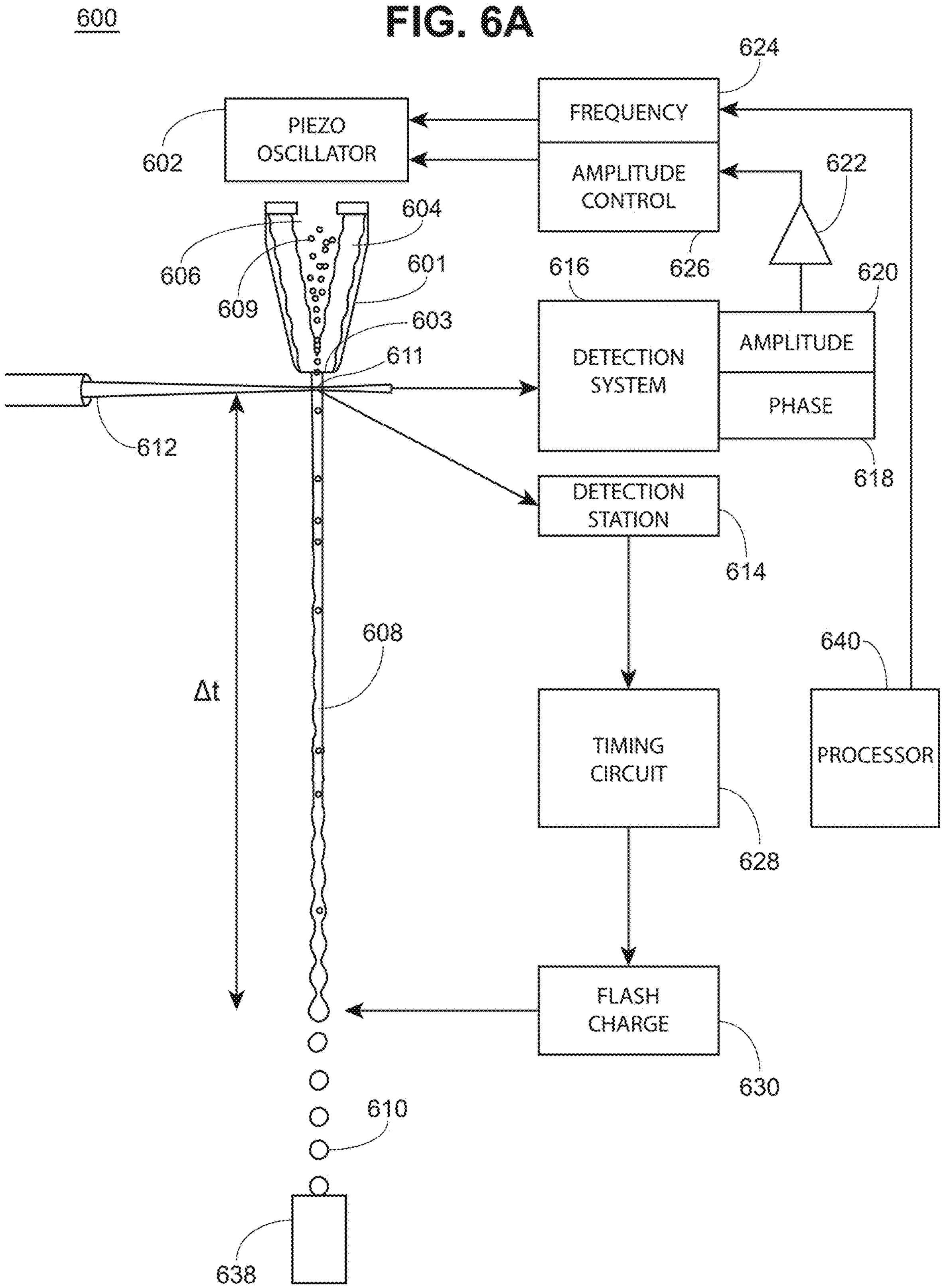
FIG. 6A depicts a schematic drawing of a particle sorter system according to certain embodiments.

FIG. 6A is a schematic drawing of a particle sorter system 600 (e.g., the particle analyzer or sorting system 502) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g., a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay ($\Delta t$), a flash charge can be applied to the moving fluid column 608 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 6A, the drops can be collected in a drain receptacle 638.

A detection system 616 (e.g., a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

Figure 6B:
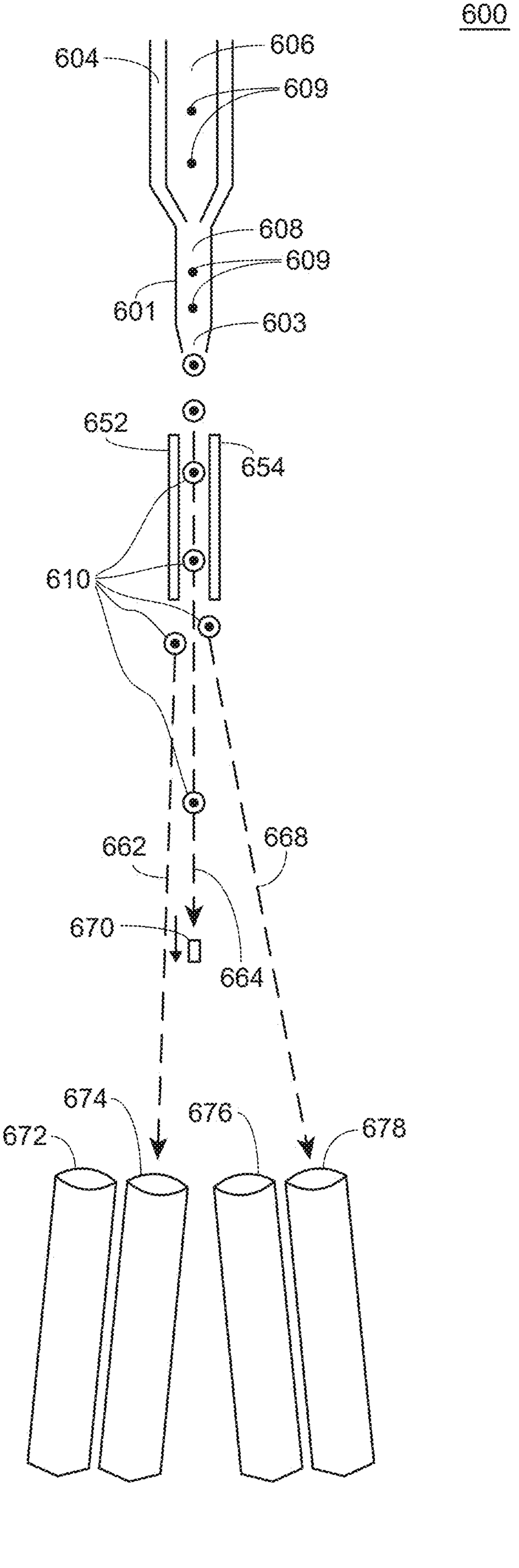
FIG. 6B depicts a schematic drawing of a particle sorter system according to certain embodiments.
Figure 7:
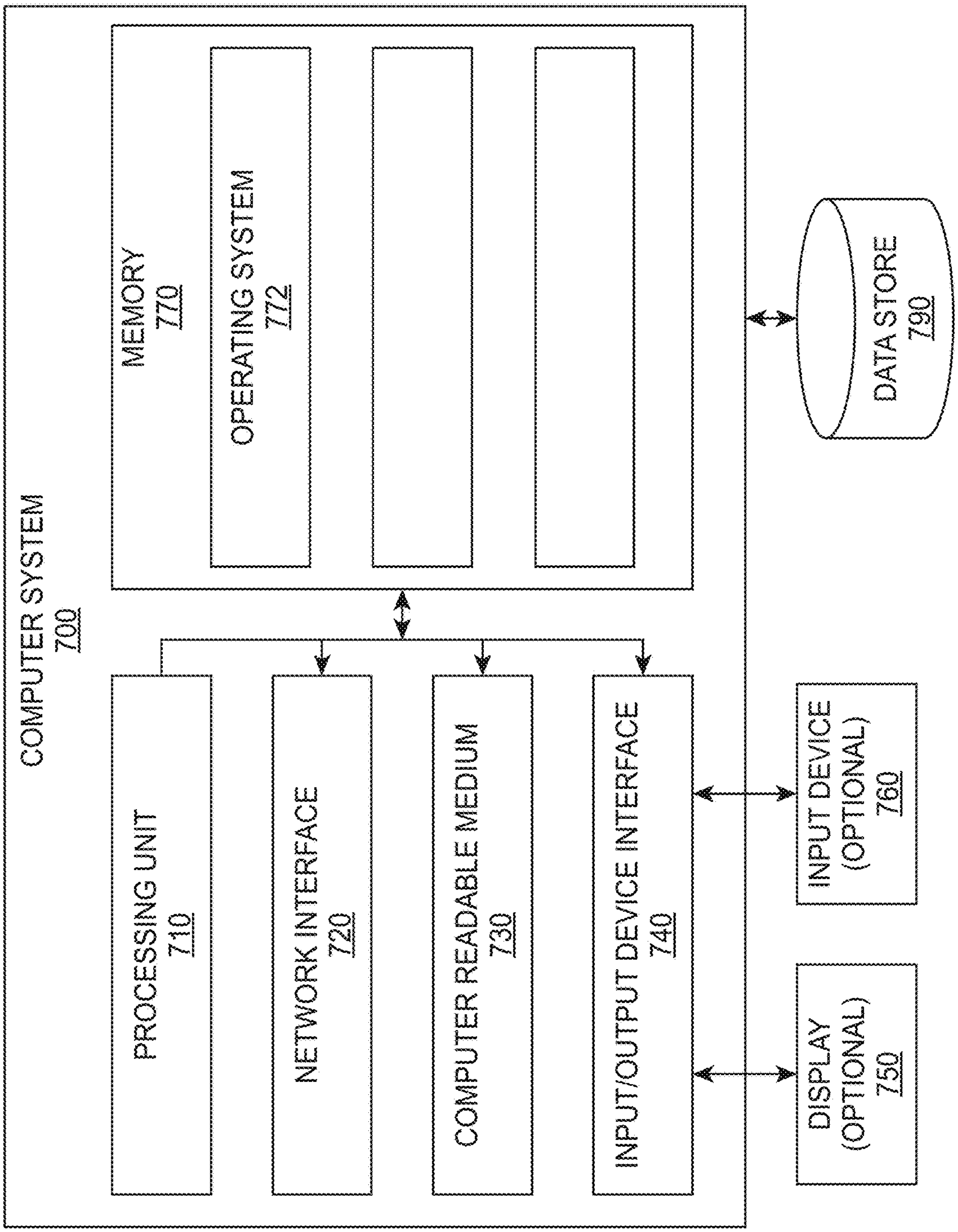
FIG. 7 depicts a block diagram of a computing system according to certain embodiments.

FIG. 6B is a schematic drawing of a particle sorter system, in accordance with one embodiment presented herein. The particle sorter system 600 shown in FIG. 6B, includes deflection plates 652 and 654. A charge can be applied via a stream-charging wire in a barb. This creates a stream of droplets 610 containing particles 610 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678). As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, NJ).

Non-Transitory Computer-Readable Storage Medium

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Python, Java, Java Script, C, C#, C++, Go, R, Swift, PHP, as well as any many others.

Non-transitory computer readable storage medium according to certain embodiments have algorithm for measuring light from a sample comprising label-free particles in a flow stream, algorithm for generating an image of one or more of the particles from the measured light, algorithm for calculating image parameters from the generated image of the one or more particles and algorithm for generating a particle sort decision based on the calculated image parameters. In some instances, the image parameters include one or more of center of mass, delta center of mass, diffusivity, eccentricity, long axis moment, maximum intensity, radial moment, short axis moment, size, total intensity, light loss by the particle, forward scattered light by the particle and side scattered light by the particle. In some instances, particles from the sample are classified based on one or more of the calculated image parameters. In some instances, the non-transitory computer readable storage medium includes algorithm for classifying the particle based on 5 or more calculated image parameters.

In some instances, the non-transitory computer readable storage medium includes algorithm for classifying the particle by comparing one or more of the calculated image parameters with ground-truth image classification parameters. In some instances, the non-transitory computer readable storage medium includes algorithm for classifying the particle based on a threshold between the calculated image parameters of the particle and the ground-truth image classification parameters. In some instances, the non-transitory computer readable storage medium includes algorithm for determining the ground-truth image classification parameters. In certain instances, the non-transitory computer readable storage medium includes algorithm for contacting particles from the sample with one or more fluorescent labels, algorithm for irradiating the fluorescently labelled particles with a light source, algorithm for measuring fluorescence from the irradiated particles, algorithm for identifying the particles from the sample based on the measuring fluorescence, algorithm for determining image parameters of the identified particles and algorithm for generating ground-truth image classification parameters for the identified particles. In some instances, the particles are labeled with 4 or more different fluorophores. In some instances, the non-transitory computer readable storage medium includes algorithm for generating the images of the labelled particles from frequency-encoded data signals. In some instances, the non-transitory computer readable storage medium includes algorithm for generating, the ground-truth image classification parameters from the image of the fluorescently labelled particles.

In some embodiments, the non-transitory computer readable storage medium is programmed with a dynamic algorithm that updates based on determined image parameters of the fluorescently labelled particles. In some instances, the non-transitory computer readable storage medium is programmed with a machine-learning algorithm to generate the ground-truth image classification parameters from the fluorescently-labelled particles. In some instances, the generated images from the fluorescently-labelled particles are used as training data for generating the ground-truth image classification parameters.

In some embodiments, the non-transitory computer readable storage medium includes algorithm for classifying particles of the sample by assigning the particle to one or more particle population clusters. In some instances, the non-transitory computer readable storage medium includes algorithm for assigning a particle to a particle population cluster based on the comparison between the ground-truth image classification parameters of each particle population cluster and the calculated image parameters of the particles. In certain embodiments, the non-transitory computer readable storage medium includes algorithm for determining one or more sorting gates for the classified particles of the sample. In some instances, the non-transitory computer readable storage medium includes algorithm for determining the one or more sorting gates which capture particles of a target particle population cluster and exclude particles of a non-target particle population cluster. In some instances, the non-transitory computer readable storage medium includes algorithm for determining sorting gates using the ground-truth image classification parameters of each particle population cluster. In some instances, the sorting gates maximize the inclusion yield of particles of a target particle population cluster. In some instances, the sorting gates maximize the exclusion of particles of a non-target particle population cluster. In some instances, the non-transitory computer readable storage medium includes algorithm for determining sorting gates which exclude particles of a non-target particle population cluster based on a calculated Mahalanobis distance from the ground-truth image classification parameters of each particle population cluster. In some instances, the non-transitory computer readable storage medium includes algorithm for calculating an Fβ score, where the Fβ score comprises a weighted harmonic mean of the inclusion of particles of a target particle population cluster and the exclusion of particles of a non-target particle population cluster. In certain instances, the generated sorting gates have an Fβ score of 1 or more. In certain instances, the generated sorting gates have an Fβ score of less than 1. In some instances, particle sort decision uses 8 sorting gates or less, such as 4 sorting gates or less.

The non-transitory computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as those mentioned above, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Kits

Aspects of the present disclosure further include kits, where kits include one or more of the integrated circuits described herein. In some embodiments, kits may further include programming for the subject systems, such as in the form of a computer readable medium (e.g., flash drive, USB storage, compact disk, DVD, Blu-ray disk, etc.) or instructions for downloading the programming from an internet web protocol or cloud server. Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject systems, methods and computer systems find use in a variety of applications where it is desirable to analyze and sort particle components in a sample in a fluid medium, such as a biological sample. In some embodiments, the systems and methods described herein find use in flow cytometry characterization of biological samples where it is desired to keep the particles of the sample unlabelled. Embodiments of the present disclosure find use where it is desirable to provide a flow cytometer with improved cell sorting accuracy, enhanced particle collection, particle charging efficiency, more accurate particle charging and enhanced particle deflection during cell sorting.

Embodiments of the present disclosure also find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

EXAMPLES

The following examples are put forth so as to provide those of ordinary skill in the art with a complete disclosure and description of how to make and use the present invention, and are not intended to limit the scope of what the inventors regard as their invention.

Label-Free Cell Sorting of Non-Activated and Activated T Cells (T Cell Activation Model)

Figure 2A:
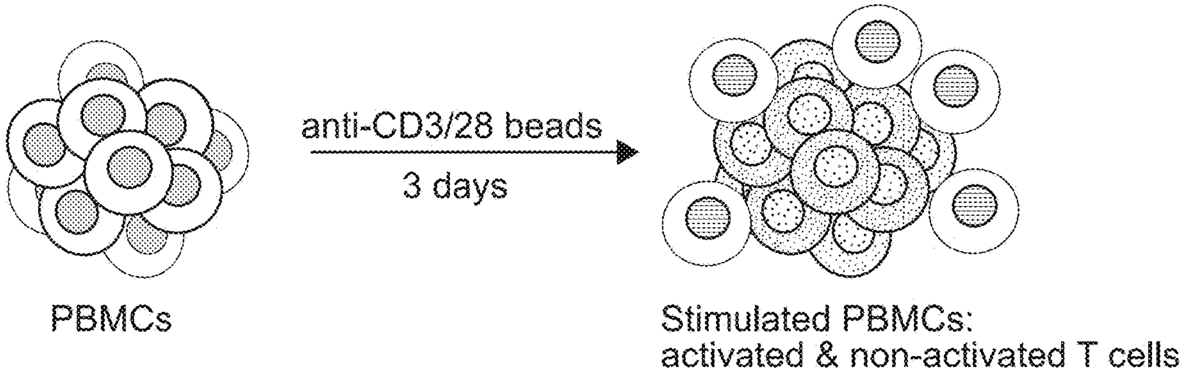
FIG. 2A depicts activation of cells from a sample and acquisition of flow cytometry data for generating an image classification parameter training dataset according to certain embodiments.
Figure 2A:
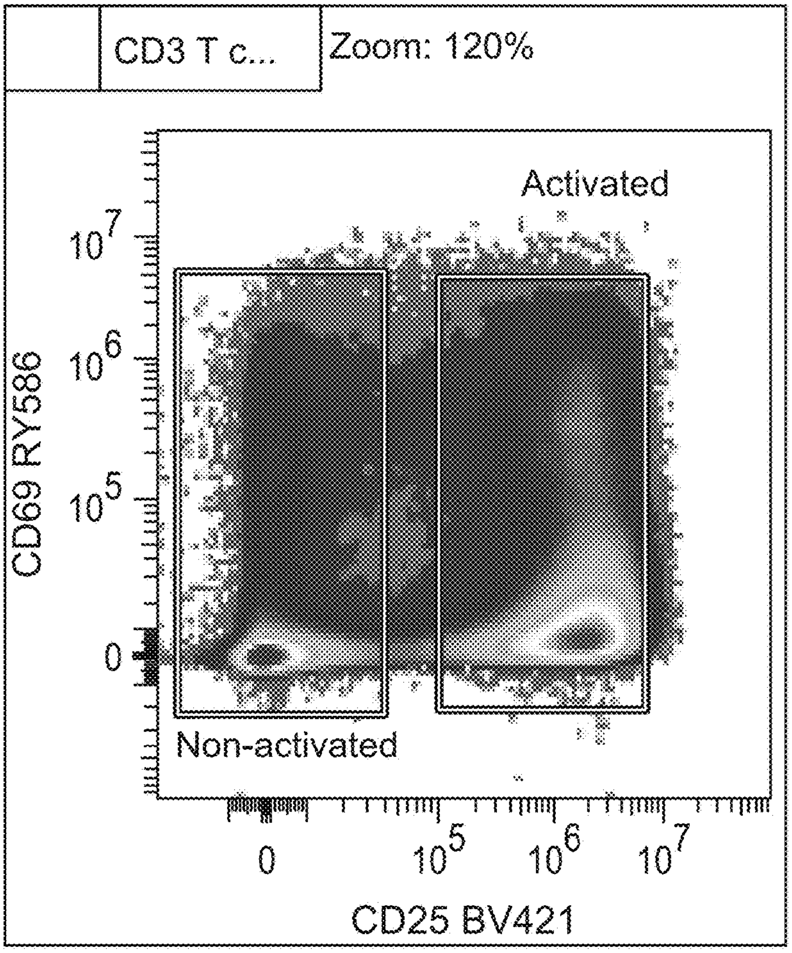
Figure 2B:
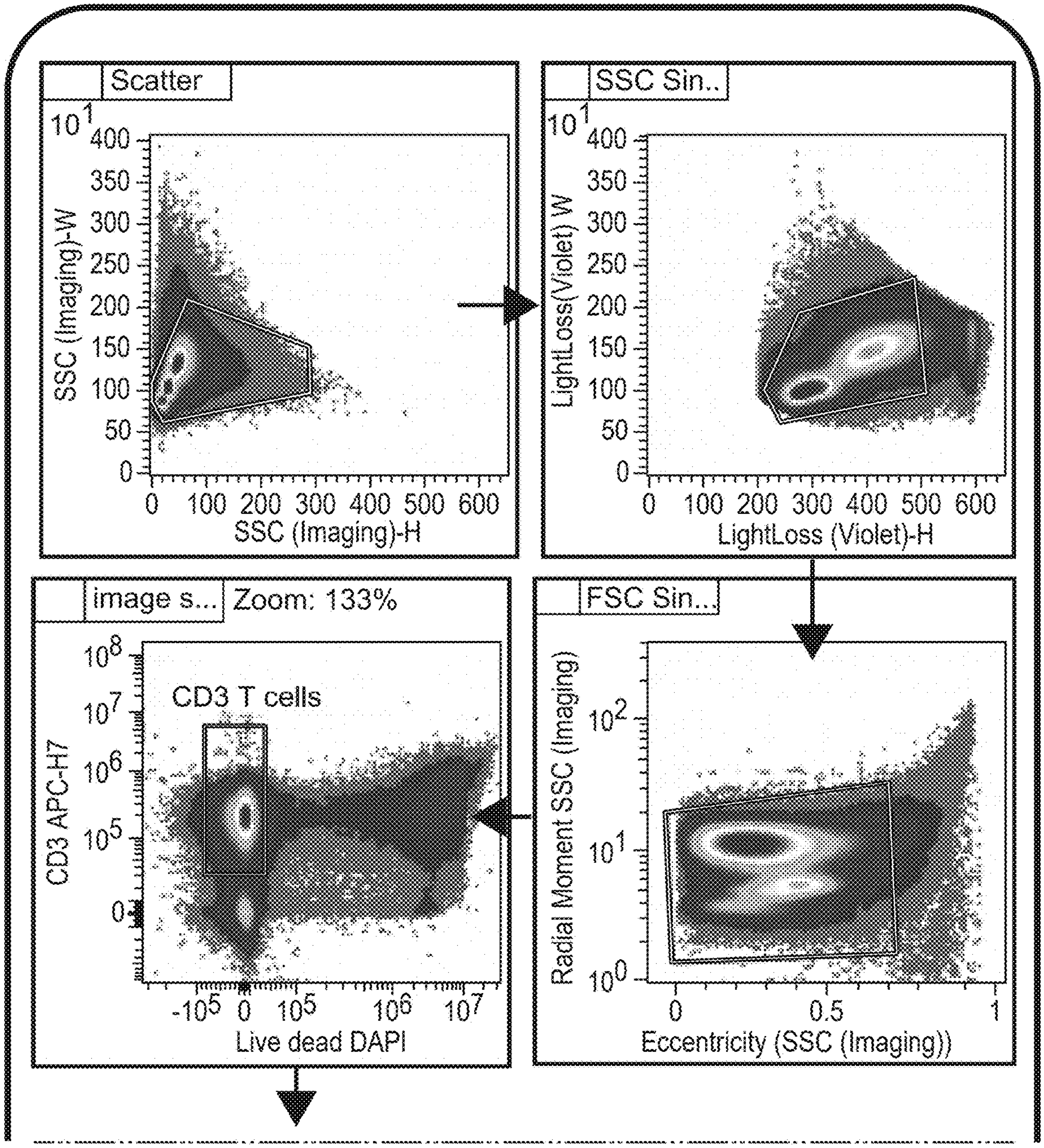
FIG. 2B depicts the generation of a ground-truth imaging training dataset for activated and non-activated cells according to certain embodiments.
Figure 2B:
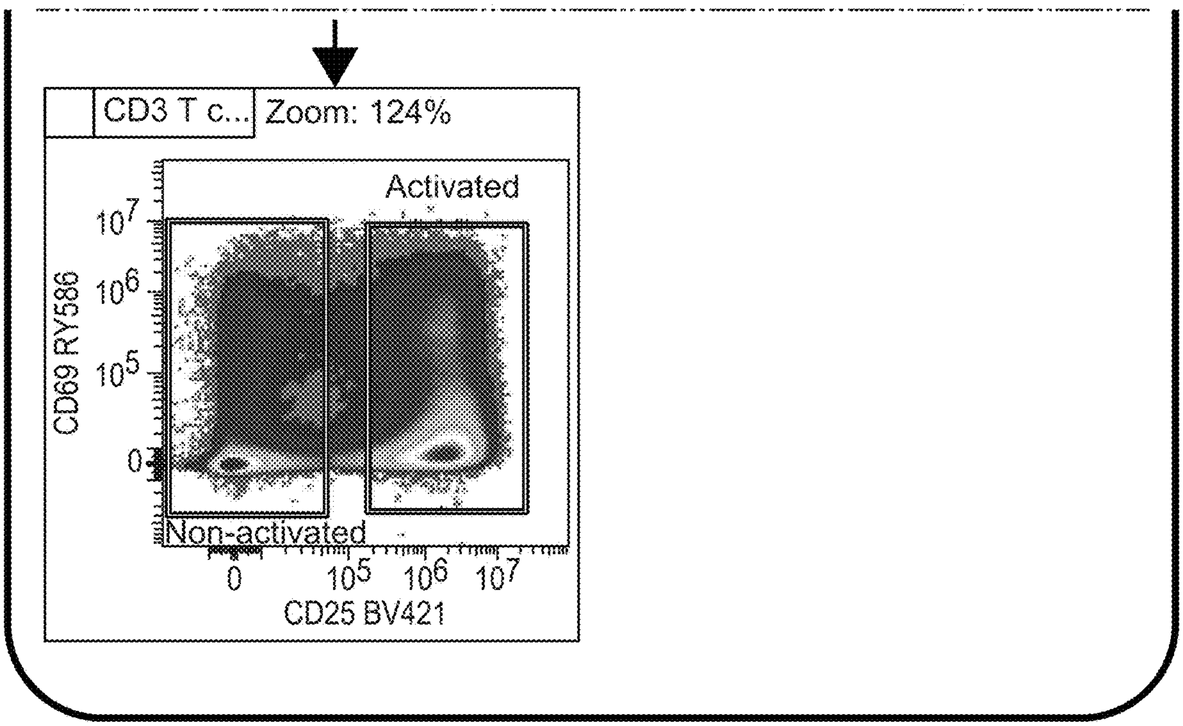
Figure 2C:
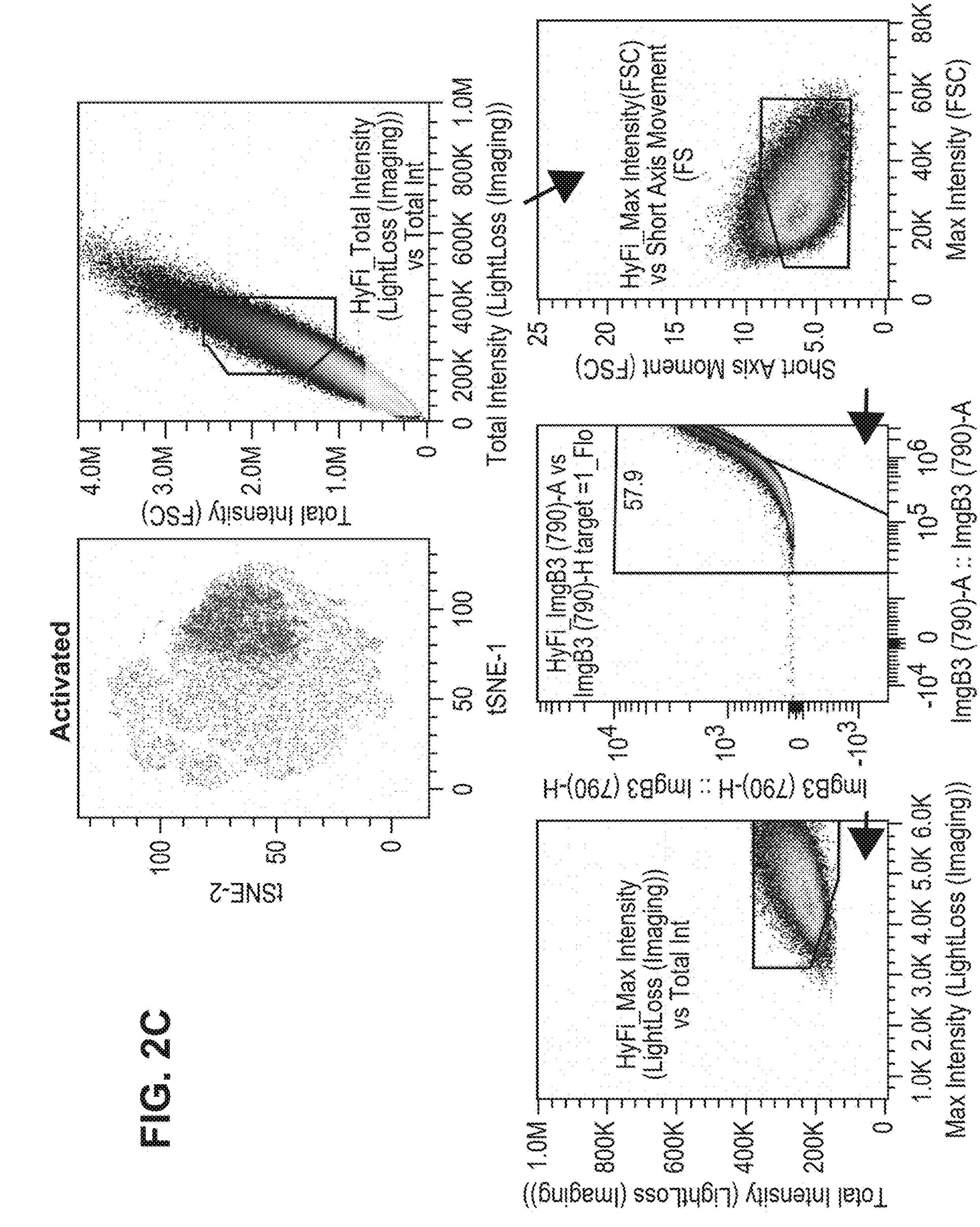
FIG. 2C depicts calculating a gating strategy using the image classification training dataset of activated and non-activated cells according to certain embodiments.
Figure 2C:
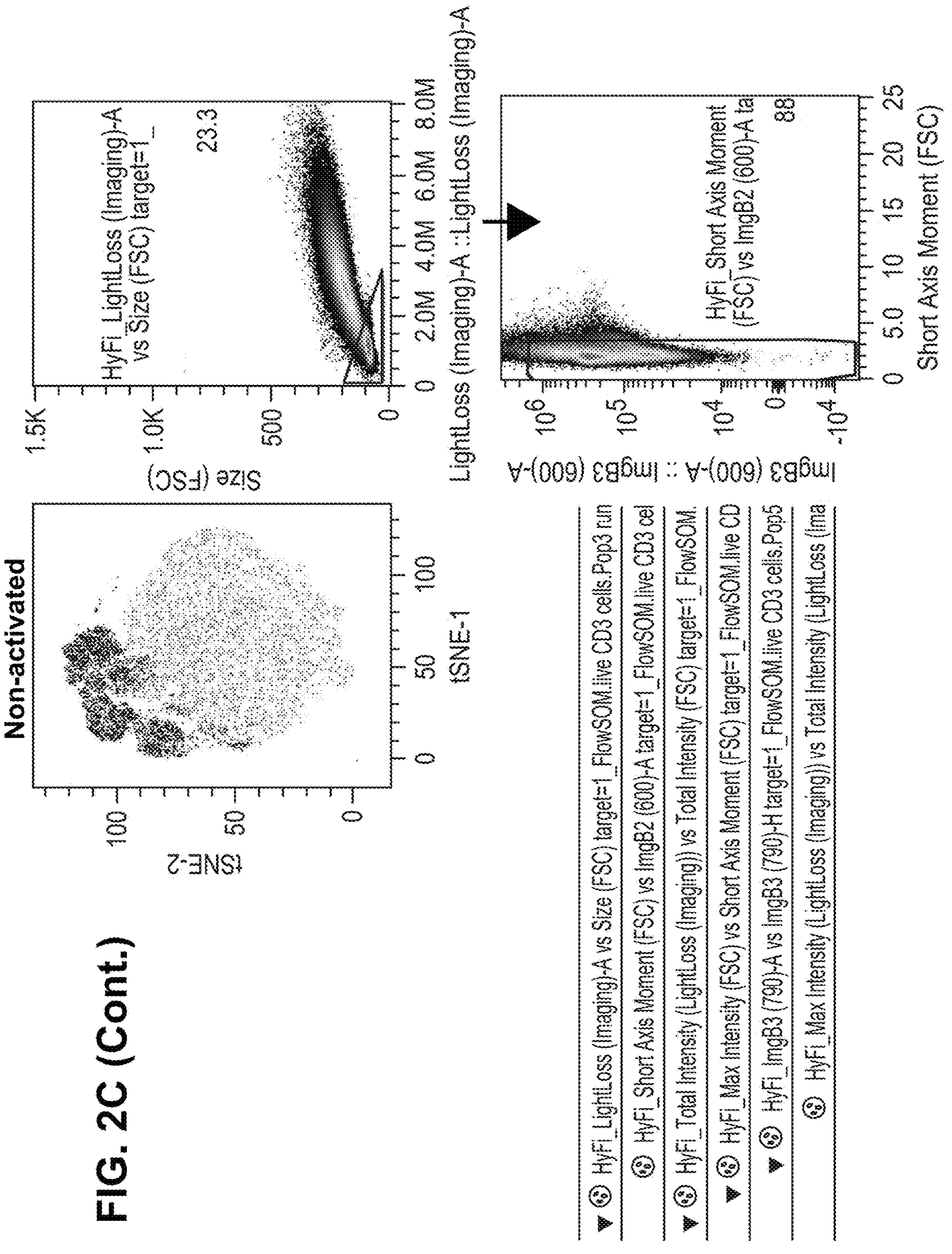
Figure 2D:
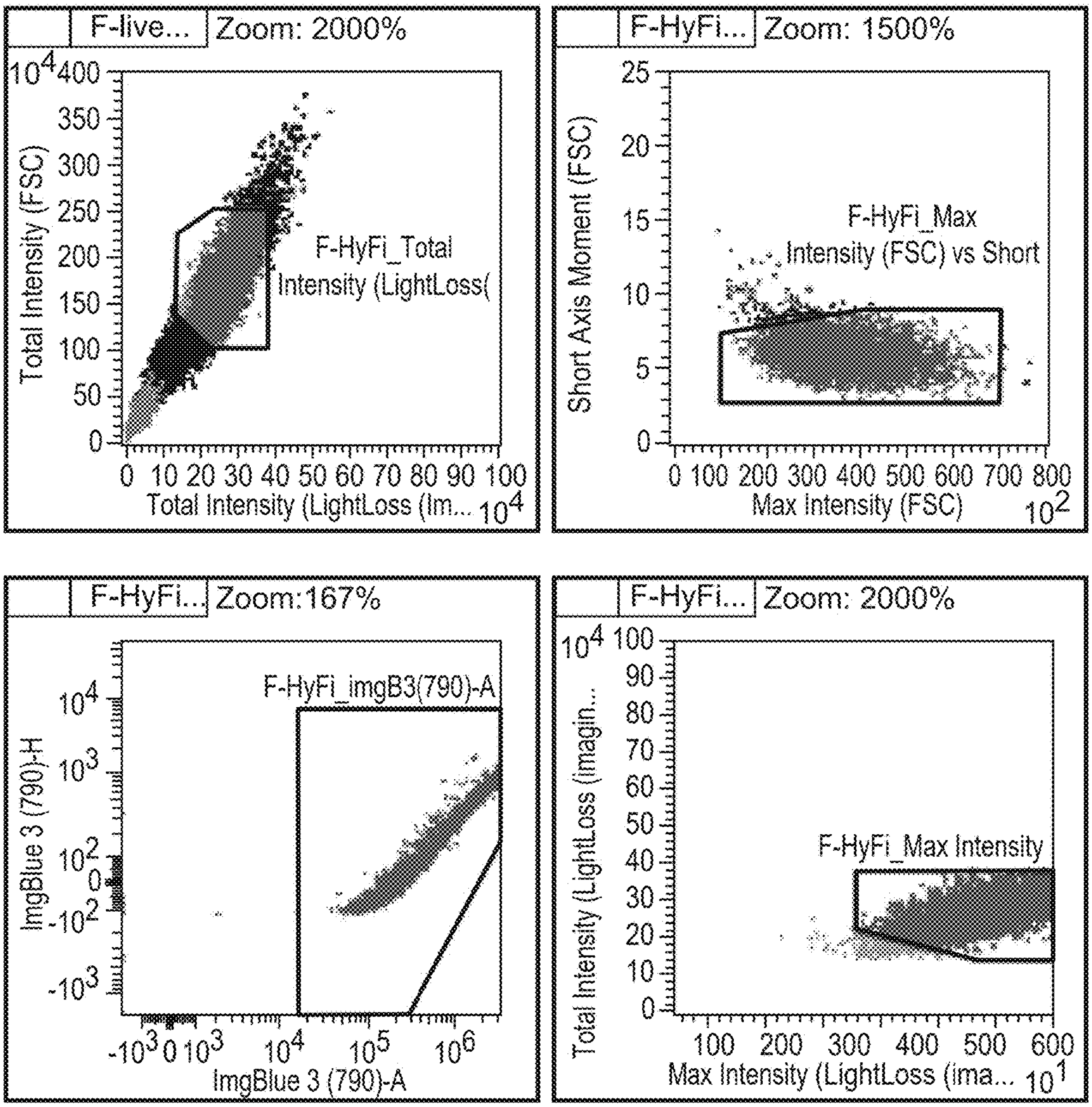
FIG. 2D depicts sorting of label-free activated cells and non-activated cells using the gating strategy generated using the ground-truth imaging training data according to certain embodiments.
Figure 2D:
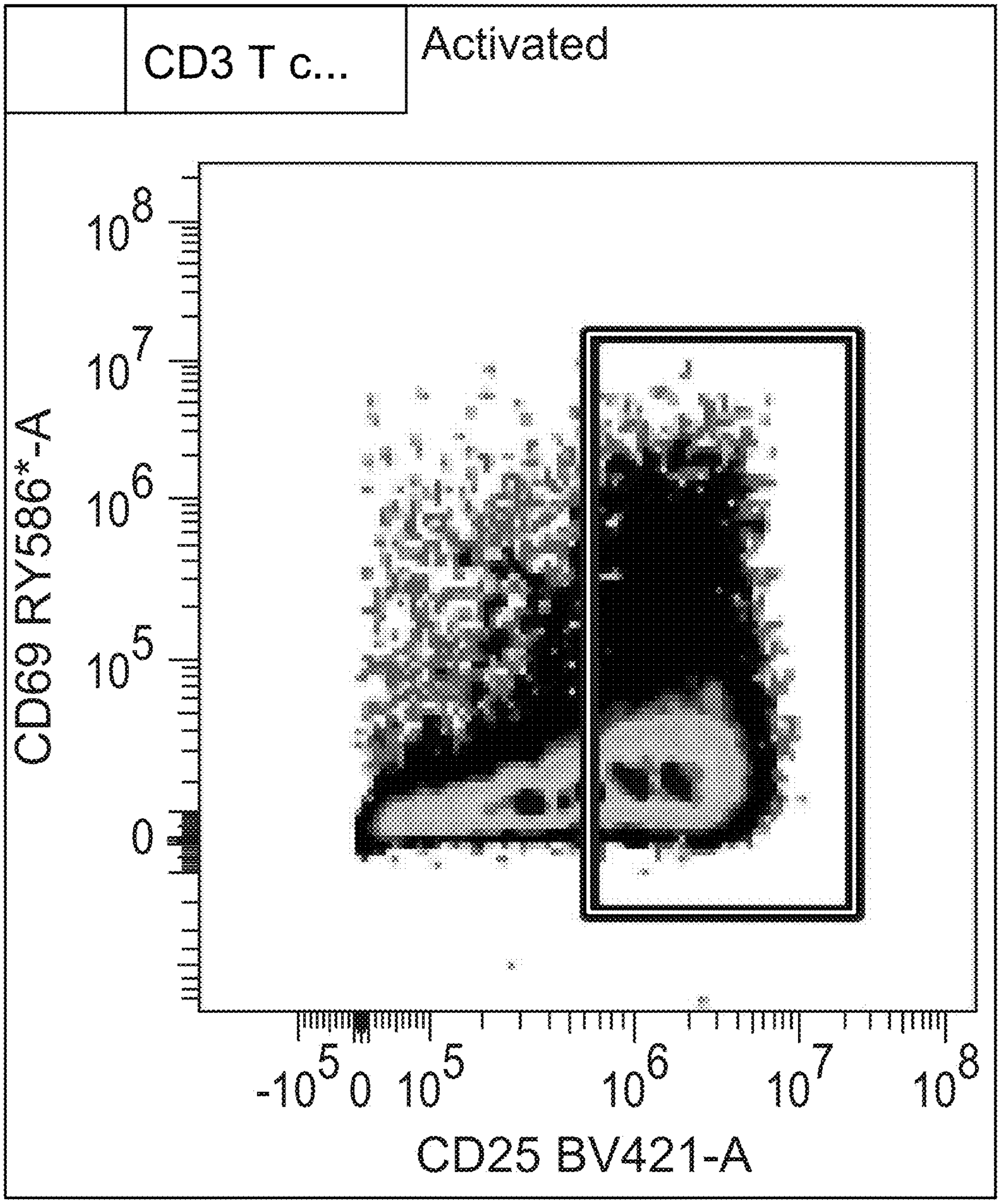
Figure 2D:
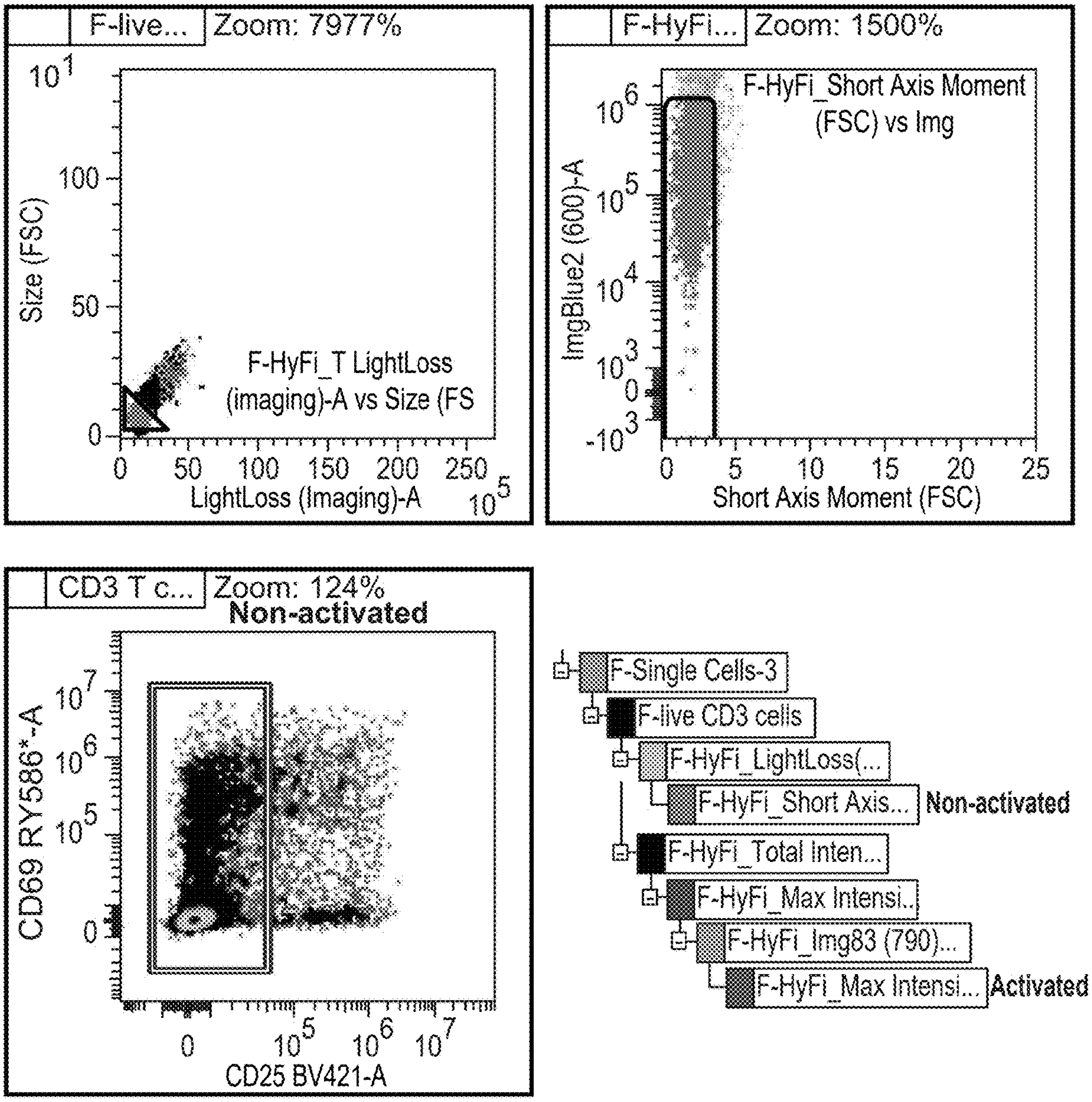

Peripheral blood mononuclear cells (PBMCs) were isolated from fresh whole blood using density gradient centrifugation. Isolated PBMCs were treated with human T cell activator CD3/28 beads for 3 days to procure a mixture of activated and non-activated T cells. Stimulated cells were harvested and stained with a 4-color panel including live/dead marker, CD3, CD69 and CD25 to evaluate T cell activation. The stained cells were acquired using a FACSDiscover Cell Sorter to generate a training dataset. FIG. 2A depicts activation of cells from the sample and acquisition of flow cytometry data for generating an image classification training dataset according to certain embodiments. FIG. 2B depicts the generation of ground-truth imaging training data for activated and non-activated cells. A mixture of activated ($CD3^+CD25^+$) and non-activated ($CD3^+CD25^-$) T cells was observed in the training dataset. FIG. 2C depicts calculating a gating strategy using the image classification training dataset of activated and non-activated cells. The training dataset was then transferred to a different computer for the HyperFinder workflow: unsupervised dimensional reduction was performed on total cells and clusters were identified using FlowSOM including non-activated T cell and activated T cell clusters. HyperFinder algorithm was applied onto the 2 clusters to generate the optimal gating strategy (B is set to 1, F score is ~0.6 for both the 2 populations). The Hyperfinder gating strategy was transferred back to the flow cytometer software on the instrument and cell sorting was performed accordingly. FIG. 2D depicts sorting of label-free activated cells and non-activated cells using the gating strategy generated using the ground-truth imaging training data. Sorted cell populations were stained with the 4-color panel to confirm their phenotype based on CD25 expression.

Label-Free Cell Sorting of Live and Dead Cells (Cell Apoptosis Model)

Figure 2E:
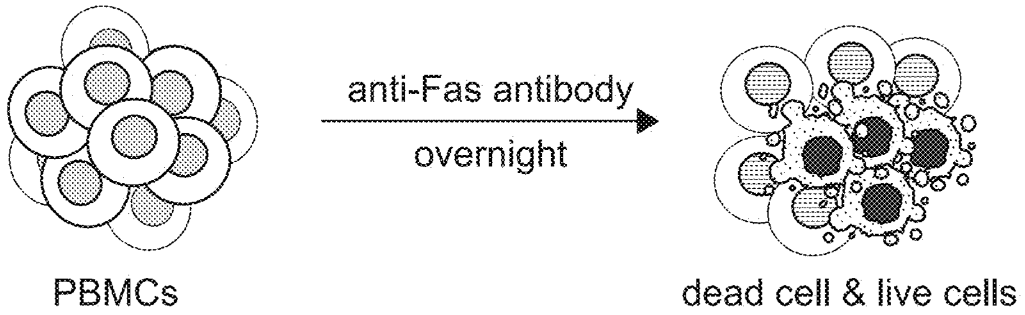
FIG. 2E depicts triggering of cell death in a sample of cells and acquisition of flow cytometry data for generating an image classification parameter training dataset according to certain embodiments.
Figure 2E:
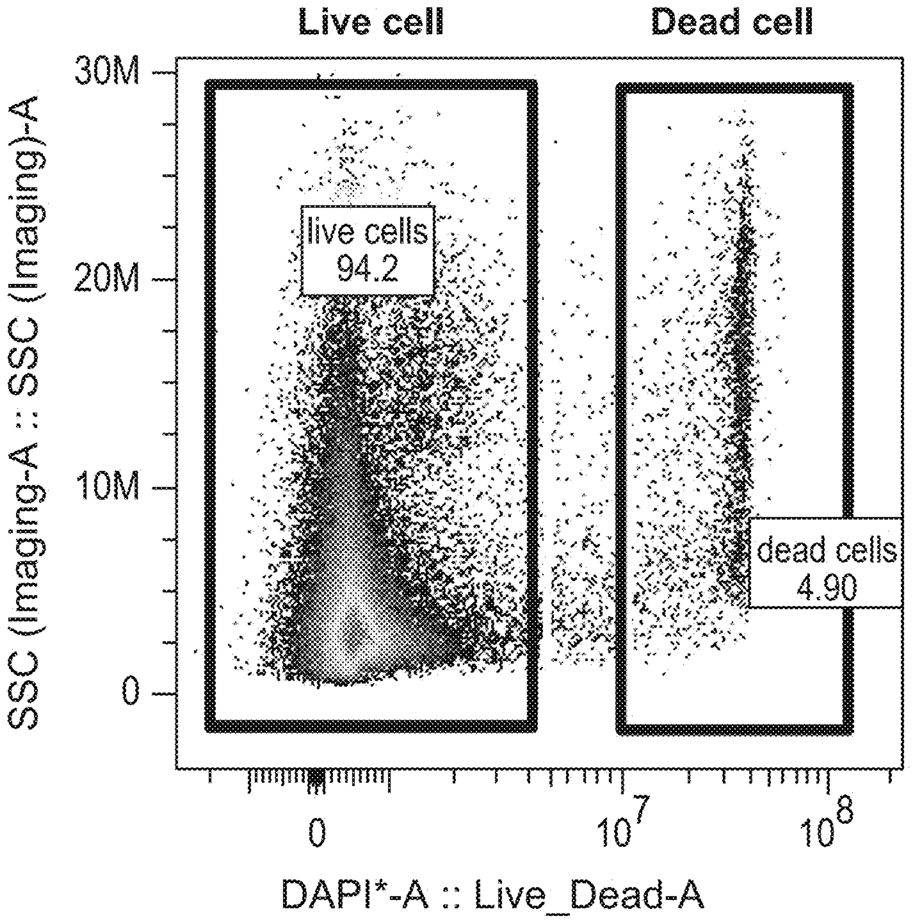
Figure 2F:
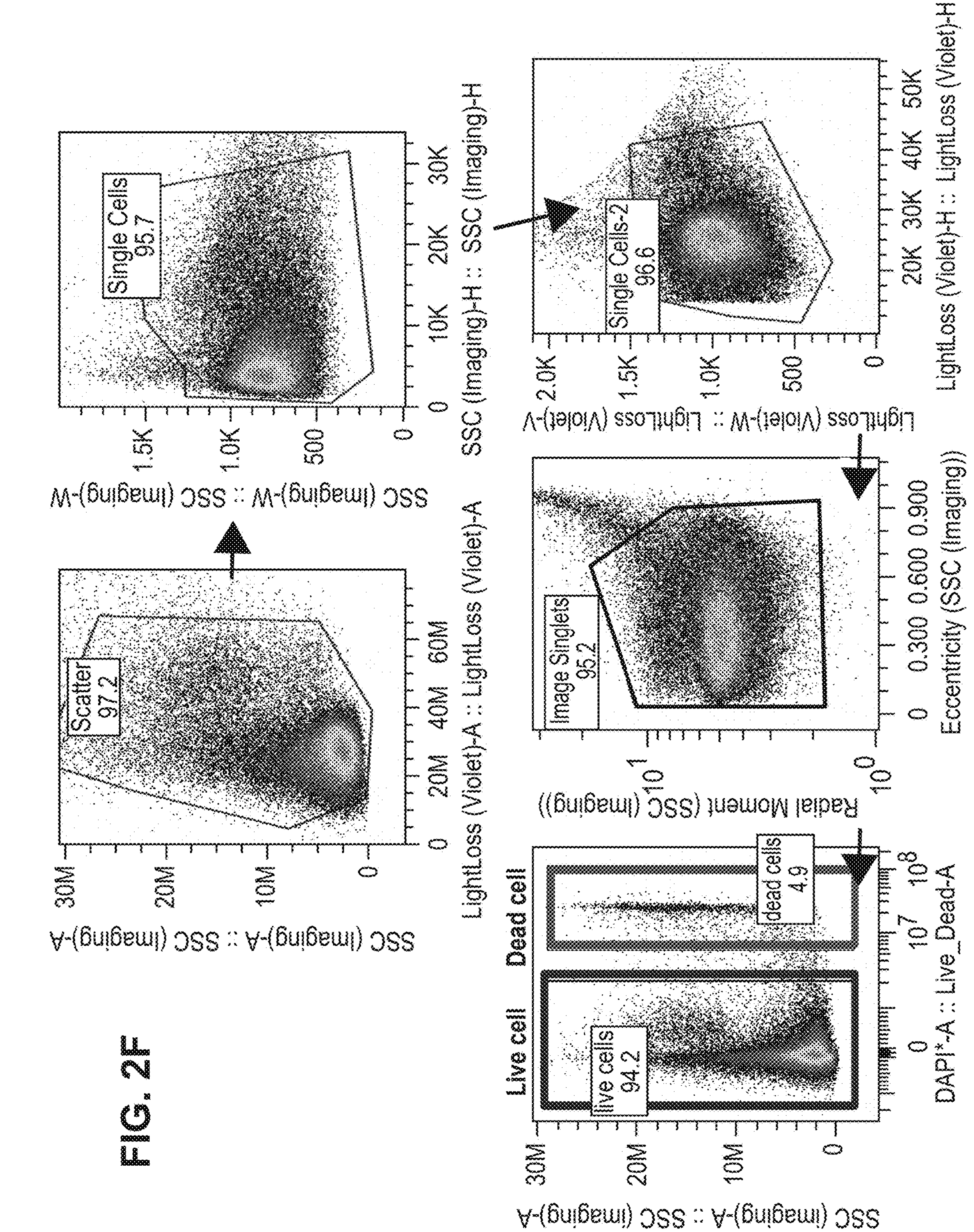
FIG. 2F depicts the generation of a ground-truth imaging training dataset for dead cells and live cells according to certain embodiments.
Figure 2G:
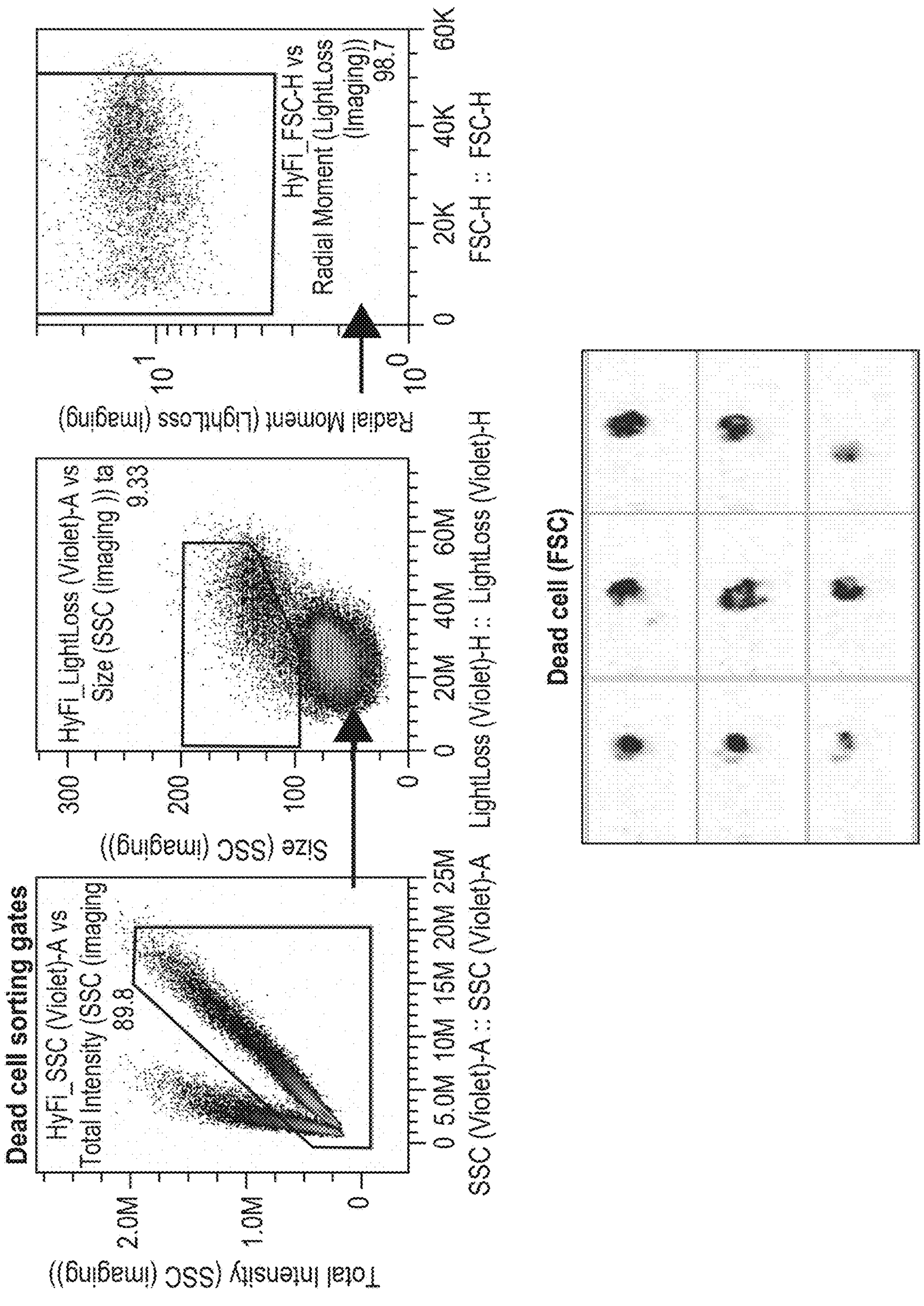
FIG. 2G depicts calculating a gating strategy using the image classification training dataset of live cells and dead cells according to certain embodiments.
Figure 2G:
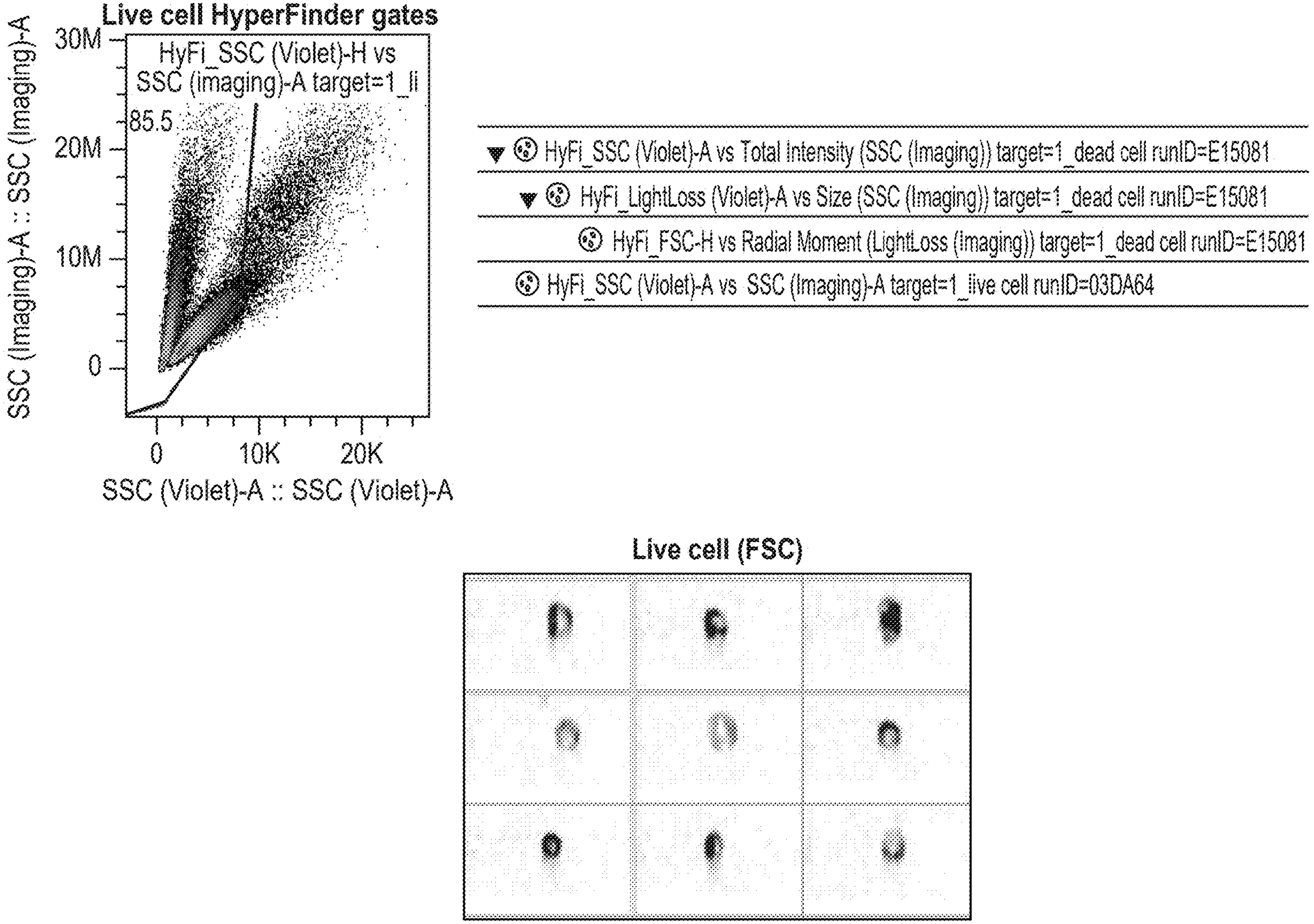
Figure 2H:
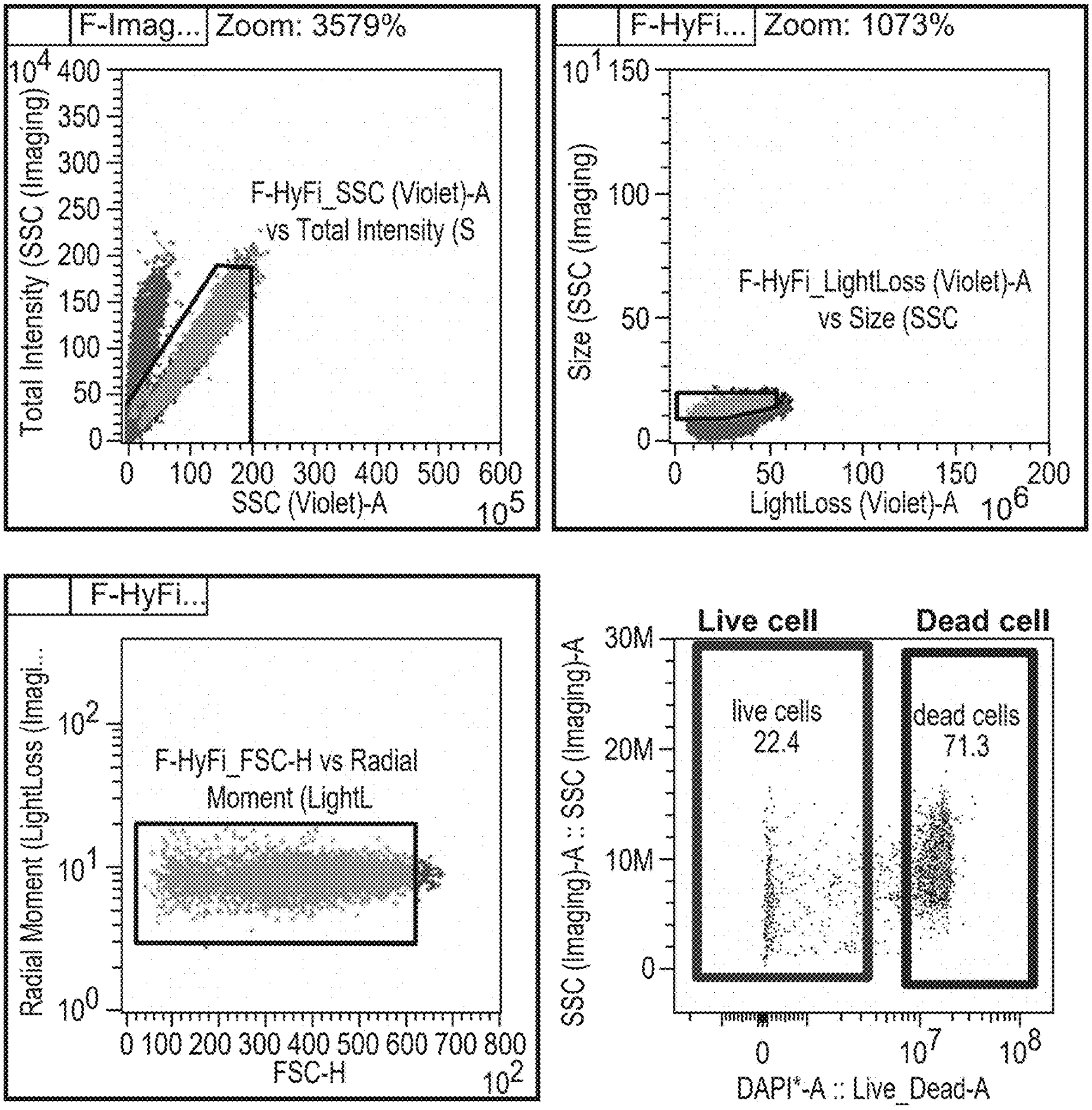
FIG. 2H depicts sorting of label-free live cells and dead cells using the gating strategy generated using the ground-truth imaging training data according to certain embodiments.
Figure 2H:
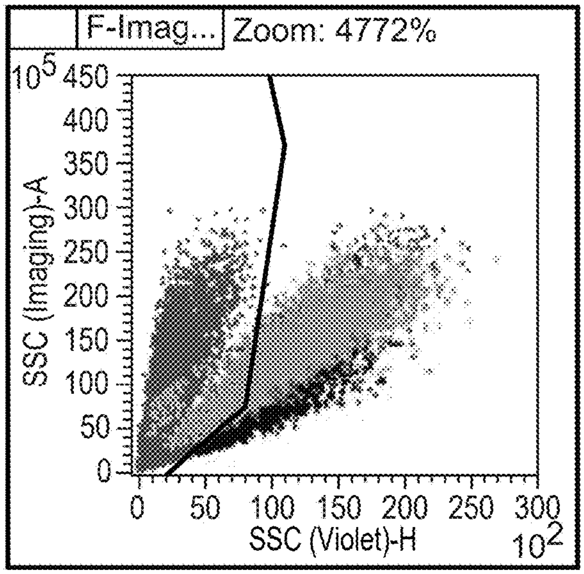
Figure 2H:
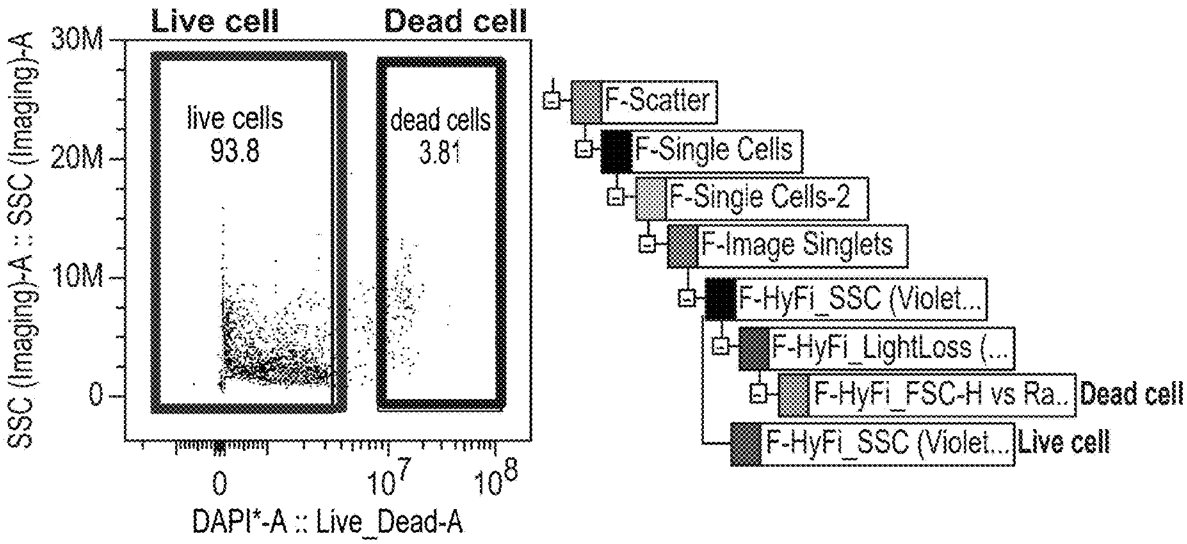

PBMCs were isolated from fresh whole blood using density gradient centrifugation. Isolated PBMCs were treated with anti-Fas antibody to trigger cell death. FIG. 2E depicts triggering of cell death in a sample of cells and acquisition of flow cytometry data for generating an image classification parameter training dataset. After overnight treatment, all cells were collected. A small portion of cells was stained with the DNA dye DAPI to differentiate live cells and dead cells. After acquisition using FACSDiscover system, a training dataset was generated. FIG. 2F depicts the generation of a ground-truth imaging training dataset for dead cells and live cells. Above 5% of dead cells were observed in the cell mixture and morphological difference in FSC imaging channel. FIG. 2G depicts calculating a gating strategy using the image classification training dataset for live and dead cells. In this example, a HyperFinder algorithm was applied on both live cell population and dead cell population to generate the optimal gating strategy (β is set to 1, F score is ~0.5 for both the 2 populations). Live and dead cells were then sorted based on the gating strategy. FIG. 2H depicts sorting of label-free live cells and dead cells using the generated gating strategy. The two sorted populations were stained with DAPI to confirm the successful execution of the workflow.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method for label-free particle sorting, the method comprising:
- measuring light from a sample comprising label-free particles in a flow stream;
- generating frequency-encoded data from the measured light;
- generating an image of one or more of the particles from the frequency-encoded data;
- calculating image parameters from the generated image of the one or more particles;
- generating population clusters based on the calculated image parameters;
- applying one or more data gates to the population clusters, wherein the data gates are calculated from ground-truth image classification parameters generated from fluorescence measured from a sample comprising particles with one or more fluorescent labels; and
- generating a particle sort decision for the label-free particles based on the applied data gates.

2. The method according to claim 1, wherein the image parameters are selected from the group consisting of center of mass, delta center of mass, diffusivity, eccentricity, long axis moment, maximum intensity, radial moment, short axis moment, size, total intensity, light loss by the particle, forward scattered light by the particle, side scattered light by the particle and combinations thereof.

3. The method according to claim 1, wherein the method comprises classifying the particle based on one or more of the calculated image parameters.

4. The method according to claim 3, wherein the particle is classified based on 5 or more calculated image parameters.

5. The method according to claim 1, wherein classifying the particle is based on a threshold between the calculated image parameters of the particle and the ground-truth image classification parameters.

6. The method according to claim 1, wherein the method further comprises determining the ground-truth image classification parameters.

7. The method according to claim 6, wherein the ground-truth image classification parameters are determined by:
- contacting particles from the sample with one or more fluorescent labels;

irradiating the fluorescently labelled particles with a light source;

measuring fluorescence from the irradiated particles;

identifying the particles from the sample based on the measured fluorescence;

determining image parameters of the identified particles; and generating ground-truth image classification parameters for the identified particles.

8. The method according to claim 7, wherein the particles from the sample are contacted with 4 or more different fluorescent labels.

9. The method according to claim 7, wherein generating ground-truth image classification parameters further comprises generating an image of the fluorescently labelled particles.

10. The method according to claim 9, wherein the ground-truth image classification parameters are generated from the image of the fluorescently labelled particles.

11. The method according to claim 7, wherein generating ground-truth image classification parameters comprises a dynamic algorithm that updates based on determined image parameters of the fluorescently labelled particles.

12. The method according to claim 7, wherein generating ground-truth image classification parameters comprises a machine learning algorithm.

13. The method according to claim 1, wherein the particle is assigned to a particle population cluster based on the comparison between the ground-truth image classification parameters of each particle population cluster and the calculated image parameters of the particle.

14. The method according to claim 1, wherein the one or more gates capture particles of a target particle population cluster and exclude particles of a non-target particle population cluster.

15. The method according to claim 1, wherein the gates are determined using the ground-truth image classification parameters of each particle population cluster.

16. The method according to claim 1, wherein the gates maximize the inclusion yield of particles of a target particle population cluster.

17. The method according to claim 1, wherein the gates maximize the exclusion of particles of a non-target particle population cluster.

* * * * *